(12) United States Patent
Nam et al.

(10) Patent No.: US 12,474,890 B2
(45) Date of Patent: Nov. 18, 2025

(54) SEMICONDUCTOR MEMORY APPARATUS AND OPERATING METHOD THEREOF

(71) Applicant: SK hynix Inc., Icheon (KR)

(72) Inventors: Ji Hoon Nam, Icheon (KR); Sang Eun Je, Icheon (KR)

(73) Assignee: SK hynix Inc., Icheon (KR)

( * ) Notice: Subject to any disclaimer, the term of this patent is extended or adjusted under 35 U.S.C. 154(b) by 912 days.

(21) Appl. No.: 17/534,212

(22) Filed: Nov. 23, 2021

(65) Prior Publication Data

US 2023/0040775 A1    Feb. 9, 2023

(30) Foreign Application Priority Data

Aug. 3, 2021   (KR) .................. 10-2021-0102170

(51) Int. Cl.
G06F 7/544    (2006.01)
G06F 3/06    (2006.01)

(52) U.S. Cl.
CPC .......... *G06F 7/5443* (2013.01); *G06F 3/0604* (2013.01); *G06F 3/0655* (2013.01)

(58) Field of Classification Search
CPC .................................... G06F 7/5443
See application file for complete search history.

(56) References Cited

U.S. PATENT DOCUMENTS 10,055,383 B1 * 8/2018 Shafiee Ardestani ........................ G11C 11/4093
11,210,586 B1 * 12/2021 Duong ................ G06F 12/0895

2021/0357736 A1 * 11/2021 Lu ........................ G06N 3/045
2022/0222569 A1 *  7/2022 Croxford ............... G06N 3/045
2022/0284283 A1 *  9/2022 Yin ........................ G06N 3/04
2022/0391681 A1 * 12/2022 Gokmen ................ G11C 11/54

FOREIGN PATENT DOCUMENTS

KR    10-2020-0141663 A    12/2020
KR       10-2208604 B1     1/2021

OTHER PUBLICATIONS

Patterson, David A., Hennessy, John L. 2012. Computer Architecture, Fifth Edition: A Quantitative Approach (5th. ed.). pp. J-34-J-25. Morgan Kaufmann Publishers Inc., San Francisco, CA, USA. (Year: 2012).*

* cited by examiner

*Primary Examiner* — Emily E Larocque
*Assistant Examiner* — Markus Anthony Villanueva

(57) ABSTRACT

A semiconductor memory apparatus may include: a data adjusting circuit configured to conditionally adjust a weight data value for a MAC (Multiplication and ACcumulation) operation based on comparing the weight data value to a reference data value, and generate flag information indicating whether the weight data value has been adjusted; a memory cell array circuit configured to store the adjusted weight data value outputted from the data adjusting circuit; and a data calculation circuit configured to recover, on the flag information, a result based on the weight data value from a result based on the adjusted weight data value to perform the MAC operation on an input data value and the weight data value.

26 Claims, 13 Drawing Sheets

SEMICONDUCTOR MEMORY APPARATUS AND OPERATING METHOD THEREOF

CROSS-REFERENCES TO RELATED APPLICATION

The present application claims priority under 35 U.S.C. § 119(a) to Korean application number 10-2021-0102170, filed on Aug. 3, 2021, in the Korean Intellectual Property Office, which is incorporated herein by reference in its entirety.

BACKGROUND

1. Technical Field

Various embodiments generally relate to a semiconductor memory apparatus and an operation method thereof, and more particularly, to a semiconductor memory apparatus capable of performing a MAC (Multiplication and ACcumulation) operation, and an operation method thereof.

2. Related Art

Recently, a neuromorphic device which mimics the functions of a human brain is being developed. Such a neuromorphic device performs a calculation operation on an enormous amount of data in order to support a deep learning operation, an image processing operation, and the like. The neuromorphic device includes a memory region for a calculation operation on data. The memory region is configured as a memory cell array circuit capable of storing multi-level data values. Therefore, the neuromorphic device requires components and operations for efficiently controlling the memory cell array circuit in which the multi-level data values are stored.

As a representative example of the neuromorphic device, a CIM (Computing in Memory) device performs a MAC (Multiplication and ACcumulation) operation using a memory cell array circuit. The MAC operation refers to a calculation operation of multiplying input data values by weight data values and accumulating the multiplication results to produce a final data value. In such a device, the weight data values may be stored in the memory cell array circuit. The memory cell array circuit may have a rate of change based on the data levels of the weight data values stored therein. When the memory cell array circuit has a rate of change, the weight data values stored therein may change over time to an undesired data level value. When the weight data value is undesirably changed, the final data value for the MAC operation may not be normally produced.

SUMMARY

In an embodiment, a semiconductor memory apparatus may include: a data adjusting circuit configured to produce an adjusted weight data value for a MAC (Multiplication and ACcumulation) operation by comparing the weight data value to a reference data value, and to generate flag information indicating whether the weight data value has been adjusted; a memory cell array circuit configured to store the adjusted weight data value outputted from the data adjusting circuit; and a data calculation circuit configured to recover the adjusted weight data value based on the flag information, and perform the MAC operation on an input data value and the recovered weight data value.

In an embodiment, an operation method of a semiconductor memory apparatus, comprising the steps of: adjusting a weight data value for a MAC operation by comparing the weight data value to a reference data value; generating flag information indicating whether the weight data value has been adjusted; recovering the adjusted weight data value into the weight data value, on the basis of the flag information; and performing the MAC operation on an input data value and the weight data value.

DETAILED DESCRIPTION

Figure 1:
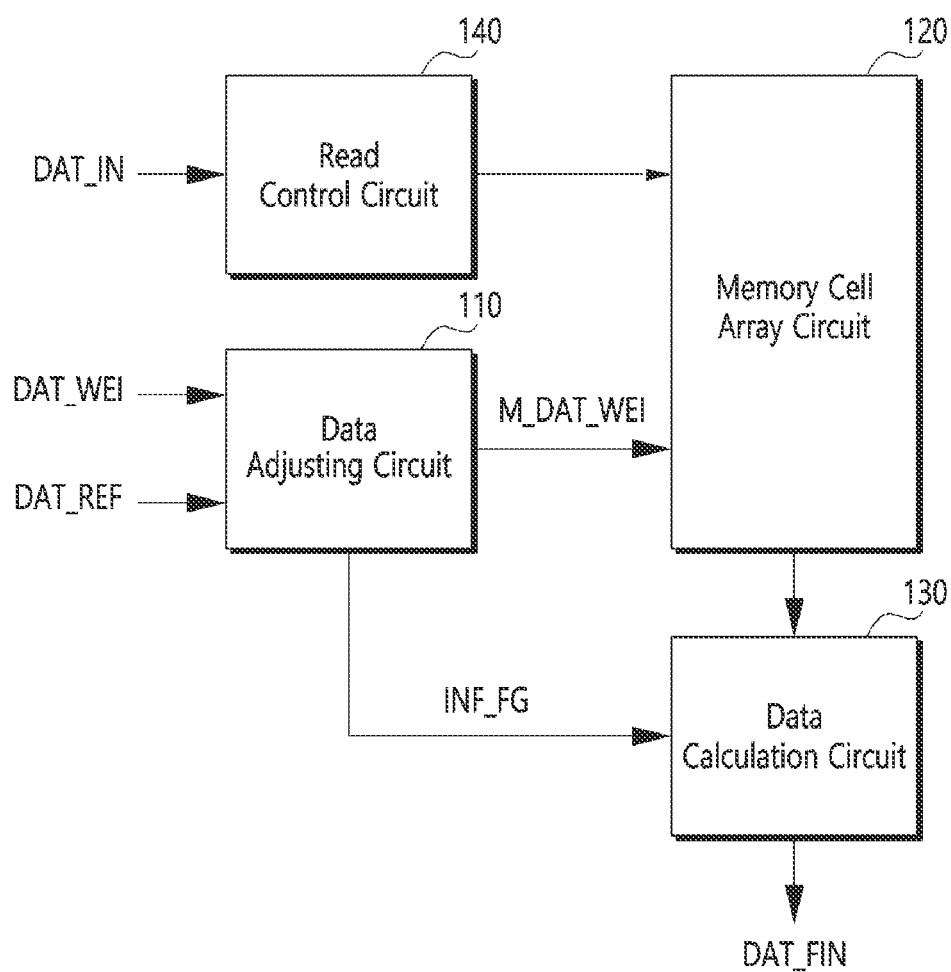
FIG. 1 is a block diagram illustrating a configuration of a semiconductor memory apparatus in accordance with an embodiment.

The description of the present disclosure is an embodiment for a structural and/or functional description. The scope of rights of the present disclosure should not be construed as being limited to embodiments described in the specification. That is, the scope of rights of the present disclosure should be understood as including equivalents, which may realize the technical spirit, because an embodiment may be modified in various ways and may have various forms. Furthermore, objects or effects proposed in the present disclosure do not mean that a specific embodiment should include all objects or effects or include only such effects. Accordingly, the scope of rights of the present disclosure should not be understood as being limited thereby.

The meaning of the terms that are described in this application should be understood as follows.

The terms, such as the "first" and the "second," are used to distinguish one element from another element, and the scope of the present disclosure should not be limited by the terms. For example, a first element may be named a second element. Likewise, the second element may be named the first element.

An expression of the singular number should be understood as including plural expressions, unless clearly expressed otherwise in the context. The terms, such as "include" or "have," should be understood as indicating the existence of a set characteristic, number, step, operation, element, part, or a combination thereof, not excluding a possibility of the existence or addition of one or more other characteristics, numbers, steps, operations, elements, parts, or a combination thereof.

In each of the steps, symbols (e.g., a, b, and c) are used for convenience of description, and the symbols do not describe an order of the steps. The steps may be performed in an order different from the order described in the context unless a specific order is clearly described in the context. That is, the steps may be performed according to a described order, may be performed substantially at the same time as the described order, or may be performed in reverse order of the described order.

All the terms used herein, including technological or scientific terms, have the same meanings as those that are typically understood by those skilled in the art, unless otherwise defined. Terms defined in commonly used dictionaries should be construed as having the same meanings as those in the context in related technology and should not be construed as having ideal or excessively formal meanings, unless clearly defined in the application.

Various embodiments are directed to a semiconductor memory apparatus capable of adjusting a weight data value stored in a memory cell array circuit according to the value of the weight data value, and an operation method thereof.

In accordance with the present embodiment, the semiconductor memory apparatus and the operation method thereof may adjust weight data values stored in the memory cell array circuit to minimize the rate of change in data level values stored in the memory cell array circuit.

FIG. 1 is a block diagram illustrating a configuration of a semiconductor memory apparatus 100 in accordance with an embodiment.

Referring to FIG. 1, the semiconductor memory apparatus 100 may include a data adjusting circuit 110, a memory cell array circuit 120, and a data calculation circuit 130.

The data adjusting circuit 110 may be configured to adjust a weight data value DAT_WEI for a MAC (Multiplication and ACcumulation) operation by comparing the weight data value DAT_WEI to a reference data value DAT_REF. The data adjusting circuit 110 may be configured to generate flag information INF_FG indicating whether the weight data value DAT_WEI has been adjusted. As will be described below with reference to FIGS. 3 and 4, the data adjusting circuit 110 may generate an adjusted weight data value M_DAT_WEI by inverting the weight data value DAT_WEI according to the comparison result between the weight data value DAT_WEI and the reference data value DAT_REF, and output the adjusted weight data value M_DAT_WEI. In an embodiment, inverting the weight data value DAT_WEI may be performed by subtracting the weight data value DAT_WEI from the maximum value (in this example, 15) that could be encoded in the number of bits needed to represent the weight data value DAT_WEI (in this example, 4); however, embodiments are not limited thereto. The flag information INF_FG will be described in more detail in accordance with the following embodiments.

The memory cell array circuit 120 may be configured to store the adjusted weight data value M_DAT_WEI outputted from the data adjusting circuit 110. Although not illustrated in FIG. 1, the memory cell array circuit 120 may include a plurality of memory cell circuits. Each of the memory cell circuits may be store the adjusted weight data value M_DAT_WEI therein. The adjusted weight data value M_DAT_WEI may have a multi-level data value. Therefore, each of the memory cell circuits may be configured as a resistive memory cell circuit capable of storing a multi-level data value, for example. Then, as will be described below, the memory cell array circuit 120 may store the adjusted weight data value M_DAT_WEI to minimize the rate of change in the data level value stored in each of the memory cell circuits.

For reference, the multi-level data value may include 16-step data level values such as may be represented as four bits, for example. The lowest data level value may be defined as a data level value '0', for example, and the highest data level value may be defined as a data level value '15', for example.

In this connection, when a data value stored in a memory cell circuit corresponds to a high data level value, the rate of change in the data level value (such as may be referred to as a decay rate of the data level value) maybe greater than for a lower data level value. Furthermore, when a data value stored in a memory cell circuit corresponds to a low data level value, the rate of change in the data level value may be lower than for a higher data level value. When the rate of change in a data level value stored in a memory cell circuit is high, it increases the probability that the data level value may be changed over time to another data level value and therefore recognized as a wrong data value.

Depending on a design structure, the memory cell circuit may have a rate of change which exhibits the opposite characteristic to the above-described rate of change for the memory cell circuit. In other words, when the data value stored in the memory cell circuit corresponds to a low data level value, the rate of change in the data level value may be higher, and when the data value stored in the memory cell circuit corresponds to a high data level value, the rate of change in the data level value may be lower.

Hereinafter, for convenience of description, the case in which the rate of change in a data level value stored in a memory cell circuit increases when the data level value stored in the memory cell circuit corresponds to a high data level value will be taken as an example, but embodiments are not limited thereto.

The data calculation circuit 130 may be configured to recover the adjusted weight data value M_DAT_WEI on the basis of the flag information INF_FG. The data calculation circuit 130 may be configured to perform a MAC operation on an input data value DAT_IN and the weight data value DAT_WEI. The data calculation circuit 130 may receive the adjusted weight data value M_DAT_WEI outputted from the memory cell array circuit 120. The data calculation circuit 130 may recover the adjusted weight data value M_DAT_WEI into the corresponding weight data value DAT_WEI which has been initially inputted on the basis of the flag information INF_FG. Accordingly, the flag information INF_FG may include position information corresponding to a memory cell circuit in which a adjusting operation has been performed, among the memory cell circuits. Therefore, the data calculation circuit 130 may recover the data value outputted from the memory cell circuit on which the adjusting operation has been performed, on the basis of the flag information INF_FG.

As will be described below, the memory cell array circuit 120 may output the adjusted weight data value M_DAT_WEI on the basis of the input data value DAT_IN. In other words, the adjusted weight data value M_DAT_WEI inputted to the data calculation circuit 130 may have a data value outputted on the basis of the input data value DAT_IN. Therefore, the adjusted weight data value M_DAT_WEI inputted to the data calculation circuit 130 may be a data value to which the input data value DAT_IN is applied.

As a result, the data calculation circuit 130 may recover the weight data value DAT_WEI from the adjusted weight data value M_DAT_WEI to which the input data value DAT_IN is applied, and perform a MAC operation. In other words, the data calculation circuit 130 may perform the MAC operation on the input data value DAT_IN and the weight data value DAT_WEI. Furthermore, the data calculation circuit 130 may generate and output a final data value DAT_FIN as the result value of the MAC operation. The data calculation circuit 130 will be described in more detail with reference to FIGS. 5 and 6.

Through the above-described configuration, the semiconductor memory apparatus 100 in accordance with the present embodiment may store the adjusted weight data value M_DAT_WEI in the memory cell array circuit 120. In an embodiment the adjusted weight data value M_DAT_WEI may have a data level value lower than the reference data value DAT_REF. Therefore, the semiconductor memory apparatus 100 may minimize the rate of change in the data level value stored in the memory cell array circuit 120. The semiconductor memory apparatus 100 may recover the weight data value DAT_WEI from the adjusted weight data value M_DAT_WEI, and perform a reliable MAC operation.

The semiconductor memory apparatus 100 may include a read control circuit 140. The read control circuit 140 may be configured to control a read operation on the memory cell array circuit 120 on the basis of the input data value DAT_IN. The read control circuit 140 may control the memory cell array circuit 120 to output a data value stored therein, i.e. the adjusted weight data value M_DAT_WEI, in response to the input data value DAT_IN.

Figure 2:
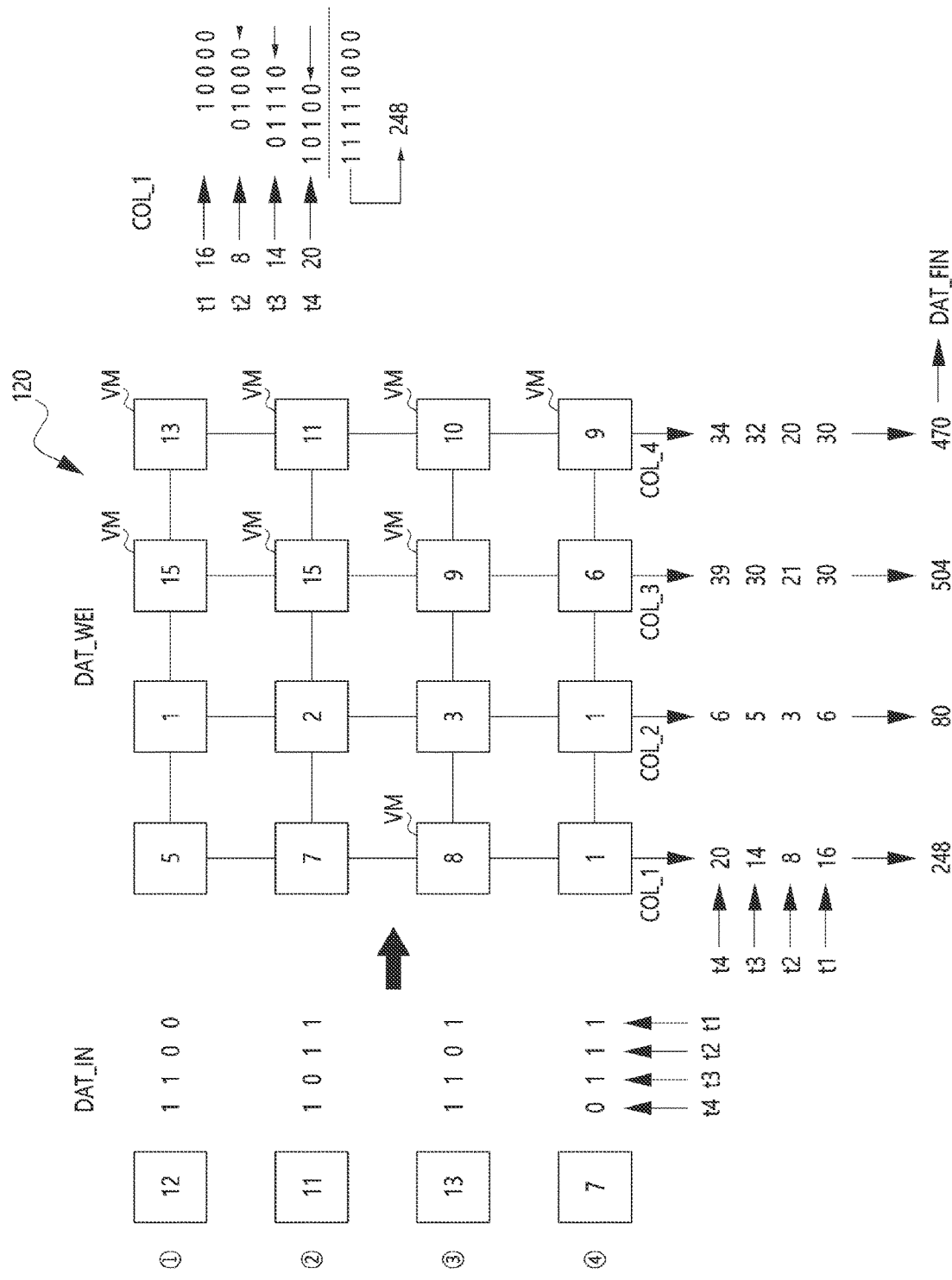
FIG. 2 is a conceptual view illustrating a MAC operation of the semiconductor memory apparatus of FIG. 1.

FIG. 2 is a conceptual view illustrating the MAC operation of the semiconductor memory apparatus 100 of FIG. 1. For convenience of description, the MAC operation of the semiconductor memory apparatus 100 is first described as if the data adjusting circuit 110 of FIG. 1 was not present.

Referring to FIG. 2, input data values DAT_IN may be inputted at first to fourth input times t1 to t4, where for each value, the least significant bit is input at the first time t1, the second least significant bit is input at the second time t2, the third least significant bit is input at the third time t3, and the most significant bit is input at the fourth time t4. The input data values DAT_IN inputted in such a manner may be a data value '12' corresponding to ①, a data value '11' corresponding to ②, a data value '13' corresponding to ③, and a data value '7' corresponding to ④. Furthermore, a respective weight data value DAT_WEI may be stored in each of the memory cell circuits of the memory cell array circuit 120 of FIG. 1. At this time, the respective weight data value DAT_WEI including a 16-step data level value, for example, may be stored in each of the memory cell circuits. In other words, each of the memory cell circuits may store a respective weight data value DAT_WEI including a respective data level value from the data level value '0' to the data level value '15'.

The data calculation circuit 130 of FIG. 1 may perform a MAC operation in the column direction of the memory cell array circuit 120, i.e. the vertical direction in the drawing.

Hereafter, a MAC operation on a first memory column COL_1 will be described.

The input data value DAT_IN may be inputted to the first through fourth rows as '0111' (corresponding to the first (least significant) bits of data values ①, ②, ③, and ④) at the first input time t1. The memory cell array circuit 120 may output a data value stored in a memory cell circuit which is enabled on the basis of the input data value DAT_IN having a '1' in the bit corresponding to the corresponding row of the memory cell circuit. In other words, the data values which are activated within the first memory column COL_1 in response to the first input time t1 may be '7', '8', and, '1' (each having a '1' in the corresponding bit of input data value DAT_IN at the first input time t1), while the data value '5' (having a '0' in the corresponding bit of input data value DAT_IN at the first input time t1) is not activated. Then, the data calculation circuit 130 may perform MAC operations on the data values which are produced by the columns of the memory cell array circuit 120.

The MAC operations may be sequentially performed as follows.

First, the calculation result value of the first memory column COL_1 at the first input time t1 may be '16' corresponding to adding up '7', '8', and '1'. Then, the input data value DAT_IN may be inputted as '0101' (corresponding to the second bits of data values ①, ②, ③, and ④) at the second input time t2. As a result, the calculation result value of the first memory column COL_1 at the second input time t2 may be '8' corresponding to adding up '7' and '1'. Subsequently, the input data value DAT_IN may be inputted as '1011' (corresponding to the third bits of data values ①, ②, ③, and ④) at the third input time t3. As a result, the calculation result value of the first memory column COL_1 at the third input time t3 may be '14'. Then, the input data value DAT_IN may be inputted as '1110' (corresponding to the fourth (most significant) bits of data values ①, ②, ③, and ④) at the fourth input time t4. As a result, the calculation result value of the first memory column COL_1 at the fourth input time t4 may be '20'.

The data calculation circuit 130 may shift the calculation result values for the first memory column COL_1 according to the time each was produced, and perform an addition operation on the results of the shifts. For example, the calculation result value of the first memory column COL_1 at the first input time t1 may be '16', i.e. '10000' as a binary number, which is not shifted. Furthermore, the calculation result value of the first memory column COL_1 at the second input time t2 may be '8', i.e. '01000' as a binary number. At this time, '01000' which is the calculation result value of the first memory column COL_1 at the second input time t2 may be shifted once, and then added to '10000' which is the calculation result value of the first memory column COL_1 at the first input time t1. Furthermore, the calculation result value of the first memory column COL_1 at the third input time t3 may be '14', i.e. '01110' as a binary number. At this time, '01110' may be shifted twice and then added to the result of the previous addition. Furthermore, the calculation result value of the first memory column COL_1 at the fourth input time t4 may become '20', i.e. '10100' as a binary number. At this time, '10100' may be shifted three times and then added to the result of the previous addition.

Therefore, a calculation result value obtained by performing the MAC operation on the first memory column COL_1 may be '11111000' as a binary number. That is, the calculation result value may be '248' as a decimal number.

In this case, the calculation result value '248' obtained by performing the MAC operation on the first memory column COL_1 may correspond to a calculation result value obtained by performing MAC operations on the data value '12' corresponding to ①), the data value '11' corresponding to ②), the data value '13' corresponding to ③), and the data value '7' corresponding to ④, which are the input data values DAT_IN, and the weight data values DAT_WEI of the first memory column COL_1, i.e. '5', '7', '8', and '1', respectively. In other words, '248' may correspond to a calculation result value obtained by calculating (12*5)+(11*7)+(13*8)+(7*1).

The data calculation circuit 130 of FIG. 1 may perform MAC operations on second to fourth memory columns COL_2 to COL_4 in the above-described manner. Thus, a calculation result value obtained by performing the MAC operation on the second memory column COL_2 may be '80', a calculation result value obtained by performing the MAC operation on the third memory column COL_3 may be '504', and a calculation result value obtained by performing the MAC operation on the fourth memory column COL_4 may be '470'. The data calculation circuit 130 may output the calculation result values of the first to fourth memory columns COL_1 to COL_4 as the final data values DAT_FIN. The final data values DAT_FIN may become the calculation result values obtained by performing the MAC operations on the input data values DAT_IN and the weight data values DAT_WEI.

As described above, a memory cell circuit VM which stores the weight data value DAT_WEI of '8' or more, for example, corresponding to a relatively high data level value, among the weight data values DAT_WEI, may have a high rate of change in data level value. In other words, the memory cell circuits VM in which '8', '9', '10', '11', '13', and '15' among the weight data values DAT_WEI are stored may each have a high rate of change in data level value.

For this reason, the semiconductor memory apparatus 100 in accordance with the present embodiment may include the data adjusting circuit 110. Thus, the semiconductor memory apparatus 100 may adjust a weight data value DAT_WEI, corresponding to a high data level value, to a low data level value, and store the adjusted weight data value in the memory cell array circuit 120. By doing so, the semiconductor memory apparatus 100 may minimize the rate of change in the data level value stored in the memory cell array circuit 120.

As described with reference to FIG. 1, the data adjusting circuit 110 may adjust the weight data value DAT_WEI by comparing the weight data value DAT_WEI and a reference data value DAT_REF. A specific example configuration of the data adjusting circuit 110 will be described below with reference to FIG. 4. Before the description of the configuration, the adjusting operation will be briefly described with reference to FIG. 3.

Figure 3:
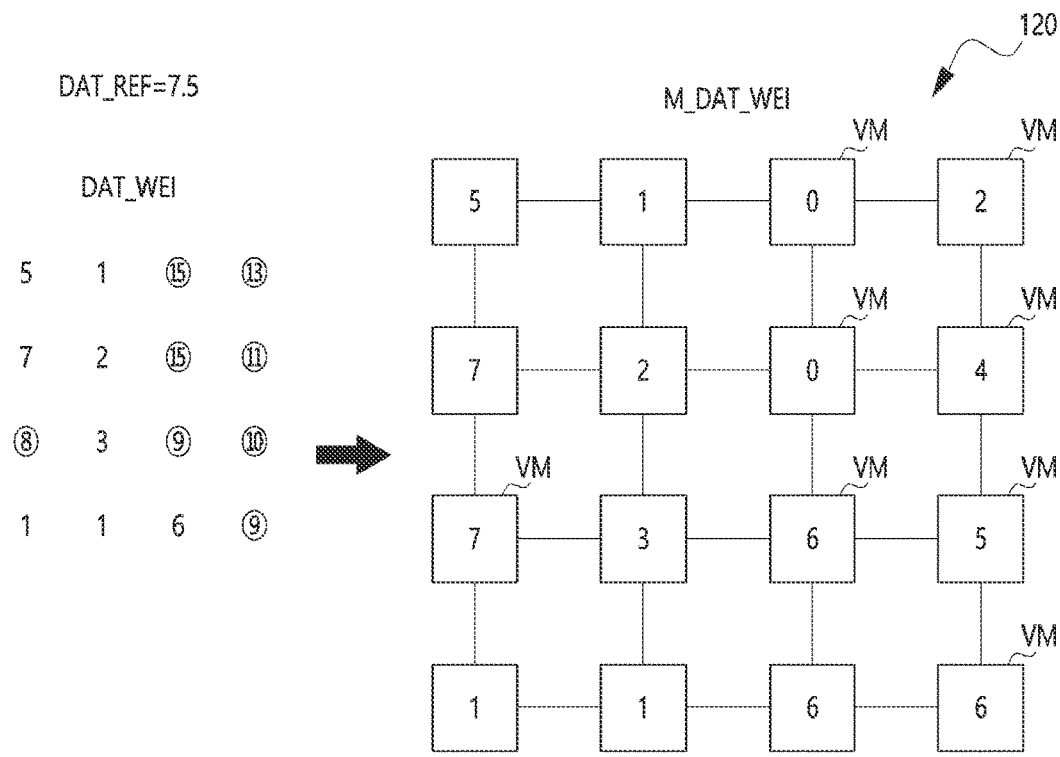
FIG. 3 is a conceptual view illustrating an operation of a data adjusting circuit of FIG. 1.

FIG. 3 is a conceptual view illustrating an operation of the data adjusting circuit 110 of FIG. 1. For convenience of description, it is assumed that the reference data value DAT_REF is 7.5.

Referring to FIGS. 1 to 3, the weight data values DAT_WEI may be inputted in the same manner as FIG. 2. In FIG. 3, each of the weight data values DAT_WEI having a high data level value is marked with a circle.

The data adjusting circuit 110 of FIG. 1 may adjust the weight data value DAT_WEI by comparing the weight data value DAT_WEI and the reference data value DAT_REF. The adjusting operation may include an operation of comparing the weight data value DAT_WEI to the reference data value DAT_REF of 7.5, and inverting the weight data value DAT_WEI according to the comparison result. In other words, the data adjusting circuit 110 may invert the weight data values DAT_WEI which correspond to data level values higher than 7.5, among the weight data values DAT_WEI, and store the inverted weight data values in the memory cell array circuit 120.

For example, among the weight data values DAT_WEI, '8' may be inverted on the basis of the reference data value DAT_REF of '7.5', and adjusted to '7'. Furthermore, among the weight data values DAT_WEI, '9' may be inverted and adjusted to '6', '10' may be adjusted to '5', '11' may be adjusted to '4', '13' may be adjusted to '2', and '15' may be adjusted to '0'. The data adjusting circuit 110 may provide the adjusted weight data values M_DAT_WEI to the memory cell array circuit 120.

As a result, the adjusted weight data value M_DAT_WEI corresponding to a low data level value may be stored in the memory cell circuit VM in which the weight data value DAT_WEI corresponding to a high data level value was to be stored. Therefore, since low data level values may be stored in all of the memory cell circuits included in the memory cell array circuit 120, the rates of change in the data level values stored therein may be minimized.

Figure 4:
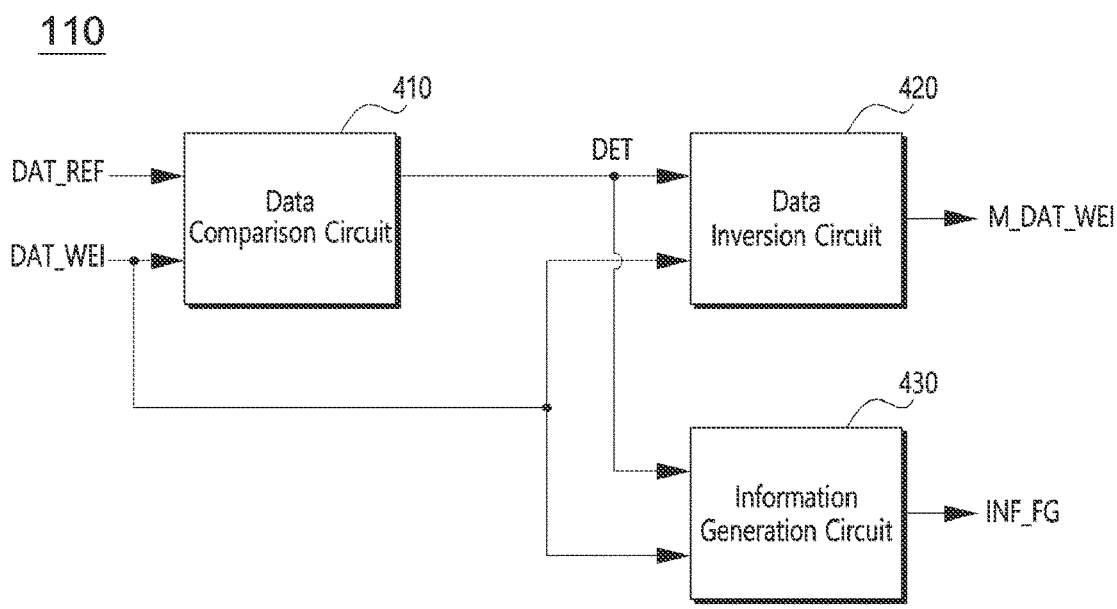
FIG. 4 is a block diagram illustrating a configuration of the data adjusting circuit of FIG. 1.

FIG. 4 is a block diagram illustrating a configuration of the data adjusting circuit 110 of FIG. 1.

Referring to FIG. 4, the data adjusting circuit 110 may include a data comparison circuit 410, a data inversion circuit 420, and an information generation circuit 430.

The data comparison circuit 410 may be configured to compare the weight data value DAT_WEI and the reference data value DAT_REF, and output the comparison result as a detection signal DET. In FIG. 3, the case in which the reference data value DAT_REF is set to '7.5' has been taken as an example, for convenience of description. However, the reference data value DAT_REF may be changed depending on settings. In other words, the reference data value DAT_REF may be set to '7', for example. The data comparison circuit 410 may compare the weight data value DAT_WEI to the reference data value DAT_REF of '7', and output the comparison result as the detection signal DET.

The data inversion circuit 420 may be configured to generate the adjusted weight data value M_DAT_WEI by inverting the weight data value DAT_WEI on the basis of the detection signal DET. Since the inverting operation for the weight data value DAT_WEI has been already sufficiently described with reference to FIG. 3, the detailed descriptions thereof will be omitted herein.

The information generation circuit 430 may be configured to generate the flag information INF_FG on the basis of the weight data value DAT_WEI and the detection signal DET. The flag information INF_FG may include information on whether the weight data value DAT_WEI has been adjusted. As described above, the flag information INF_FG may include position information corresponding to a memory cell circuit on which the adjusting operation has been performed on the corresponding data, among the memory cell circuits included in the memory cell array circuit 120 of FIG. 1.

The flag information INF_FG may be provided to the data calculation circuit 130 of FIG. 1. Therefore, the data calculation circuit 130 may effectively recover the weight data value DAT_WEI which was initially input from the data value outputted from the memory cell circuit on which the adjusting operation has been performed, i.e. the adjusted weight data value M_DAT_WEI, on the basis of the flag information INF_FG.

Figure 5:
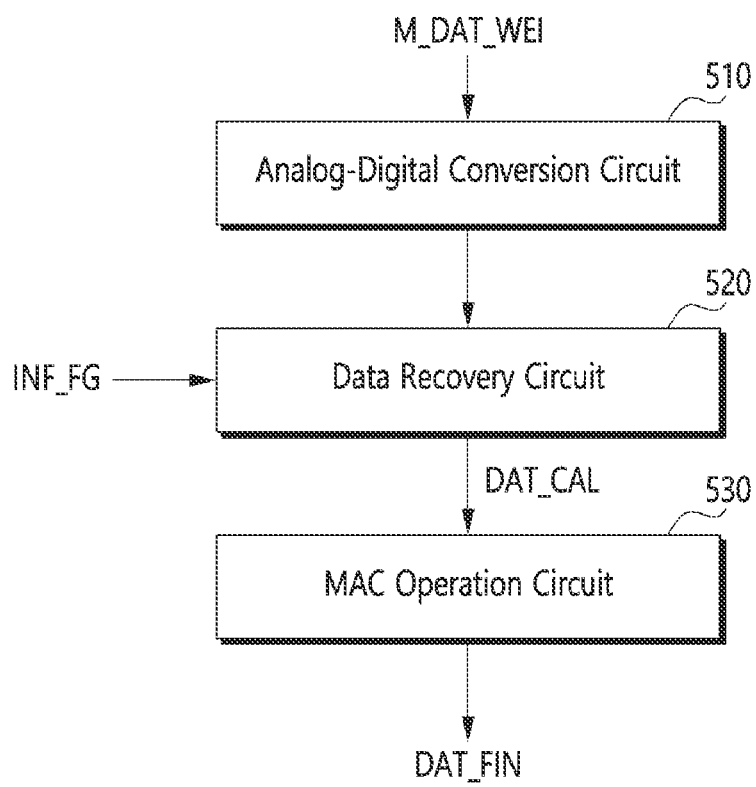
FIG. 5 is a block diagram illustrating a configuration of a data calculation circuit of FIG. 1.

FIG. 5 is a block diagram illustrating a configuration of the data calculation circuit 130 of FIG. 1.

Referring to FIGS. 1 and 5, the data calculation circuit 130 may include an analog-digital conversion circuit 510, a data recovery circuit 520, and a MAC operation circuit 530.

The analog-digital conversion circuit 510 may be configured to convert the adjusted weight data value M_DAT_WEI, outputted from the memory cell array circuit 120 of FIG. 1, into a digital data value. For reference, the adjusted weight data value M_DAT_WEI outputted from the memory cell array circuit 120 may have an analog current value corresponding to the data level value. Therefore, the analog-digital conversion circuit 510 may receive the analog adjusted weight data value M_DAT_WEI, and convert the received analog data value into a digital data value. The analog-digital conversion circuit 510 may be configured as an ADC (Analog-to-Digital Converter).

The data recovery circuit 520 may be configured to recover the digital data value, outputted from the analog-digital conversion circuit 510, on the basis of the flag information INF_FG. As described above, the flag information INF_FG may include the position information of the memory cell circuit on which the adjusting operation has been performed. Therefore, the data recovery circuit 520 may recover the weight data value DAT_WEI from the adjusted weight data value M_DAT_WEI, on which the adjusting operation has been performed, on the basis of the flag information INF_FG.

The MAC operation circuit 530 may be configured to perform a MAC operation on a recovered calculation data value DAT_CAL outputted from the data recovery circuit 520. The MAC operation circuit 530 may generate the final data value DAT_FIN through the MAC operation, such as through the shifting and accumulating operations described in the description of FIG. 2, and output the generated final data value DAT_FIN. Since the MAC operation has been already sufficiently described with reference to FIG. 2, the detailed descriptions thereof will be omitted herein.

Figure 6:
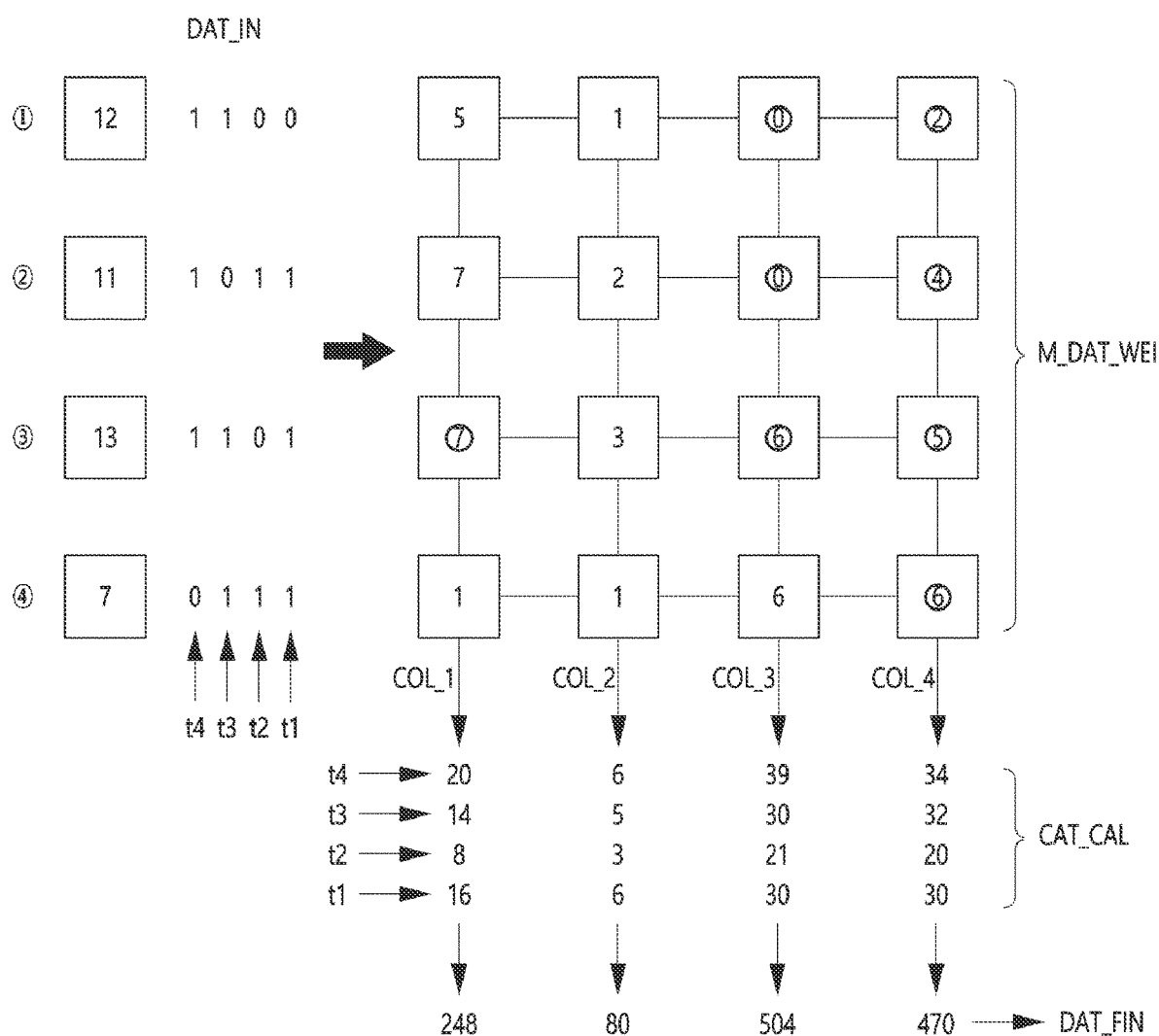
FIG. 6 is a conceptual view illustrating an operation of a data recovery circuit of FIG. 5.

FIG. 6 is a conceptual view illustrating an operation of the data recovery circuit 520 of FIG. 5. For convenience of description, the adjusted weight data values M_DAT_WEI are set to the same values as the data values stored in the memory cell array circuit 120 of FIG. 3. Furthermore, each of the memory cell circuits on which the adjusting operation has been performed is marked with a circle.

Referring to FIGS. 5 and 6, the analog-digital conversion circuit 510 may receive the adjusted weight data value M_DAT_WEI, and convert the received data value into a digital data value. The data recovery circuit 520 may recover the adjusted weight data value M_DAT_WEI on the basis of the flag information INF_FG, and output the recovered weight data value as the recovered calculation data value DAT_CAL. As illustrated in FIG. 6, the recovered calculation data values DAT_CAL may correspond to the calculation result values of the first to fourth memory columns COL_1 to COL_4 of FIG. 2, respectively.

As described above, the flag information INF_FG may include position information of the memory cell circuit on which the adjusting operation has been performed. Therefore, the data recovery circuit 520 may perform a recovery operation on the adjusted weight data value M_DAT_WEI corresponding to the memory cell circuit on which the adjusting operation has been performed. In other words, the data recovery circuit 520 may recover the adjusted weight data value M_DAT_WEI, marked with a circle, into the weight data value DAT_WEI by internally inverting the adjusted weight data value M_DAT_WEI. Then, the data recovery circuit 520 may generate the recovered calculation data values DAT_CAL into which the inverted data value is reflected, and output the generated calculation data values DAT_CAL. Then, the recovered calculation data values DAT_CAL may be provided to the MAC operation circuit 530 of FIG. 5, and outputted as the final data value DAT_FIN.

The semiconductor memory apparatus 100 in accordance with the present embodiment may adjust the weight data value DAT_WEI by comparing the weight data value DAT_WEI to the reference data value DAT_REF. Furthermore, the semiconductor memory apparatus 100 may store the adjusted weight data value M_DAT_WEI in the memory cell array circuit 120, thereby minimizing the rate of change in the data level value stored in the memory cell array circuit 120. Furthermore, the semiconductor memory apparatus 100 may recover the adjusted weight data value M_DAT_WEI into the weight data value DAT_WEI, thereby smoothly generating the final data value DAT_FIN as the calculation result value of the MAC operation.

The comparison operation between the weight data value DAT_WEI and the reference data value DAT_REF by the data comparison circuit 410 of FIG. 4 and the adjusting operation on the weight data value DAT_WEI by the data inversion circuit 420, i.e. the inverting operation, may be performed on a memory cell basis in the memory cell array circuit 120. Furthermore, the analog-digital conversion operation on the adjusted weight data values M_DAT_WEI by the analog-digital conversion circuit 510 of FIG. 5 and the recovery operation on the adjusted weight data values M_DAT_WEI by the data recovery circuit 520 may also be performed on a memory cell basis in the memory cell array circuit 120. When an operation is performed on a memory cell basis, it may indicate that the corresponding operation is performed in response to one memory cell circuit of the memory cell array circuit 120.

In particular, the recovery operation of the data recovery circuit 520 may be performed on a memory cell basis on the basis of the flag information INF_FG. Therefore, the flag information INF_FG may include position information corresponding to the memory cell circuit on which the adjusting operation has been performed. More specifically, the position information included in the flag information INF_FG may include position information corresponding to each memory cell. In this connection, the information generation circuit 430 of FIG. 4 may acquire position information corresponding to each memory cell on which the adjusting operation has been performed on the basis of the weight data value DAT_WEI and the detection signal DET.

The semiconductor memory apparatus 100 in accordance with the present embodiment may perform the recovery operation on the adjusted weight data value M_DAT_WEI on a memory cell basis.

In accordance with an embodiment, a semiconductor memory apparatus 700 (see FIG. 7) which will be described below may perform the recovery operation on the weight data value DAT_WEI on a column basis. As will be described below, the comparison operation between the weight data value DAT_WEI and the reference data value DAT_REF, the inverting operation on the weight data value DAT_WEI, the analog-digital conversion operation on the adjusted weight data value M_DAT_WEI, and the recovery operation on the adjusted weight data value M_DAT_WEI may be performed on a memory column basis. When an operation is performed on a memory column basis, it may indicate that the corresponding operation is performed individually for each of one or more memory columns of a memory cell array circuit 720 (see FIG. 7). As described above, the flag information INF_FG may include position information corresponding to the memory cell circuit on which the adjusting operation has been performed. More specifically, the position information included in the flag information INF_FG may include position information corresponding to a unit memory column, instead of the position information corresponding to a memory cell circuit as described in the embodiment of FIGS. 4-6.

Figure 7:
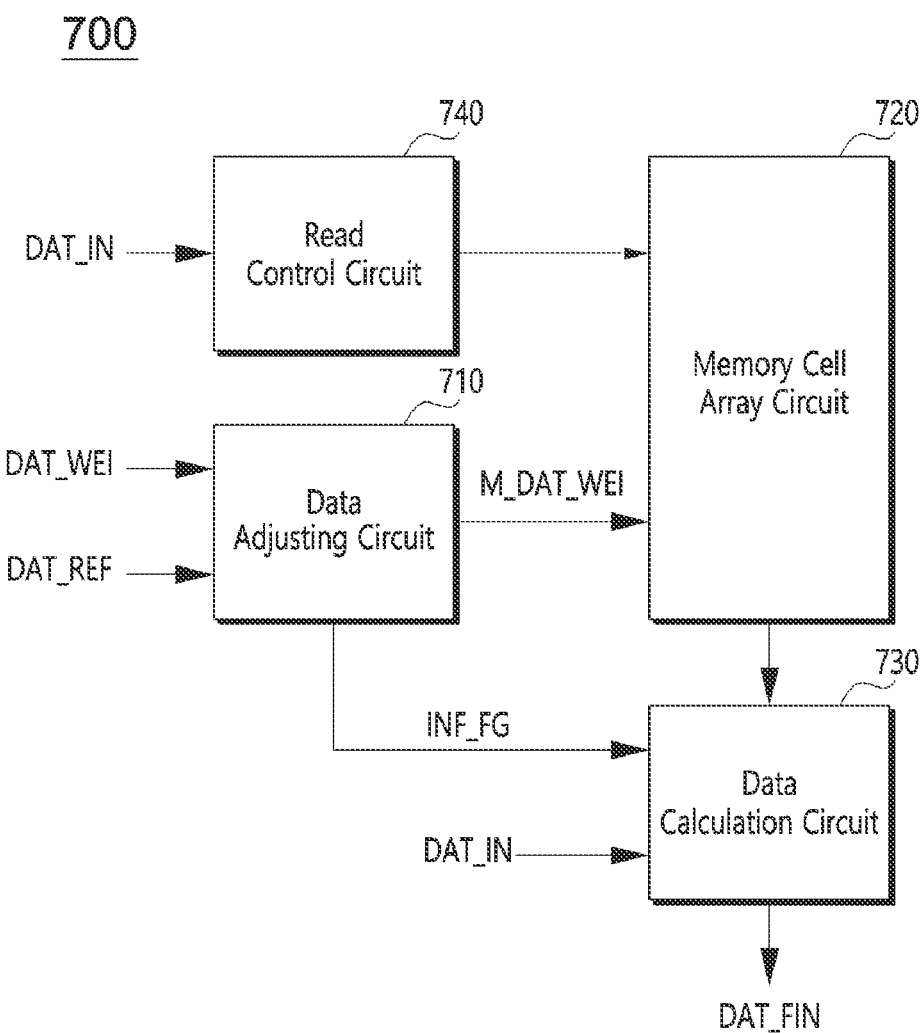
FIG. 7 is a block diagram illustrating a configuration of a semiconductor memory apparatus in accordance with an embodiment.

FIG. 7 is a block diagram illustrating a configuration of the semiconductor memory apparatus 700 in accordance with an embodiment.

Referring to FIG. 7, the semiconductor memory apparatus 700 may include a data adjusting circuit 710, the memory cell array circuit 720, a data calculation circuit 730, and a read control circuit 740. The semiconductor memory apparatus 700 of FIG. 7 may be different from the semiconductor memory apparatus 100 of FIG. 1 in terms of the internal operations and internal configurations of the data adjusting circuit 710 and the data calculation circuit 730.

The data adjusting circuit 710 may be configured to adjust a weight data value DAT_WEI for a MAC operation by comparing the weight data value DAT_WEI to a reference data value DAT_REF. The data adjusting circuit 710 may be configured to generate flag information INF_FG. Then, as will be described below with reference to FIGS. 8 and 9, the data adjusting circuit 710 may perform an inverting operation on the weight data value DAT_WEI on a memory column basis.

The memory cell array circuit 720 may be configured to store the adjusted weight data value M_DAT_WEI outputted from the data adjusting circuit 710. The memory cell array circuit 720 of FIG. 7 may correspond to the memory cell array circuit 120 of FIG. 1.

The data calculation circuit 730 may be configured to recover the adjusted weight data value M_DAT_WEI, on the basis of an input data value DAT_IN and the flag information INF_FG. The data calculation circuit 730 may be configured to perform a MAC operation on the input data value DAT_IN and the weight data value DAT_WEI. Then, as will be described below with reference to FIGS. 10 and 11, the data calculation circuit 730 may perform a recovery operation on the adjusted weight data value M_DAT_WEI on a memory column basis.

The read control circuit 740 may be configured to control a read operation on the memory cell array circuit 720, on the basis of the input data value DAT_IN. The read control circuit 740 may control the memory cell array circuit 720 to output the adjusted weight data value M_DAT_WEI stored therein, in response to the input data value DAT_IN.

As described above, the data adjusting circuit 710 may compare the weight data value DAT_WEI and the reference data value DAT_REF, and adjust the weight data value DAT_WEI on a memory column basis. The specific configuration of the data adjusting circuit 710 will be described below with reference to FIG. 9. Before the description of the configuration, the adjusting operation will be briefly described with reference to FIG. 8.

Figure 8:
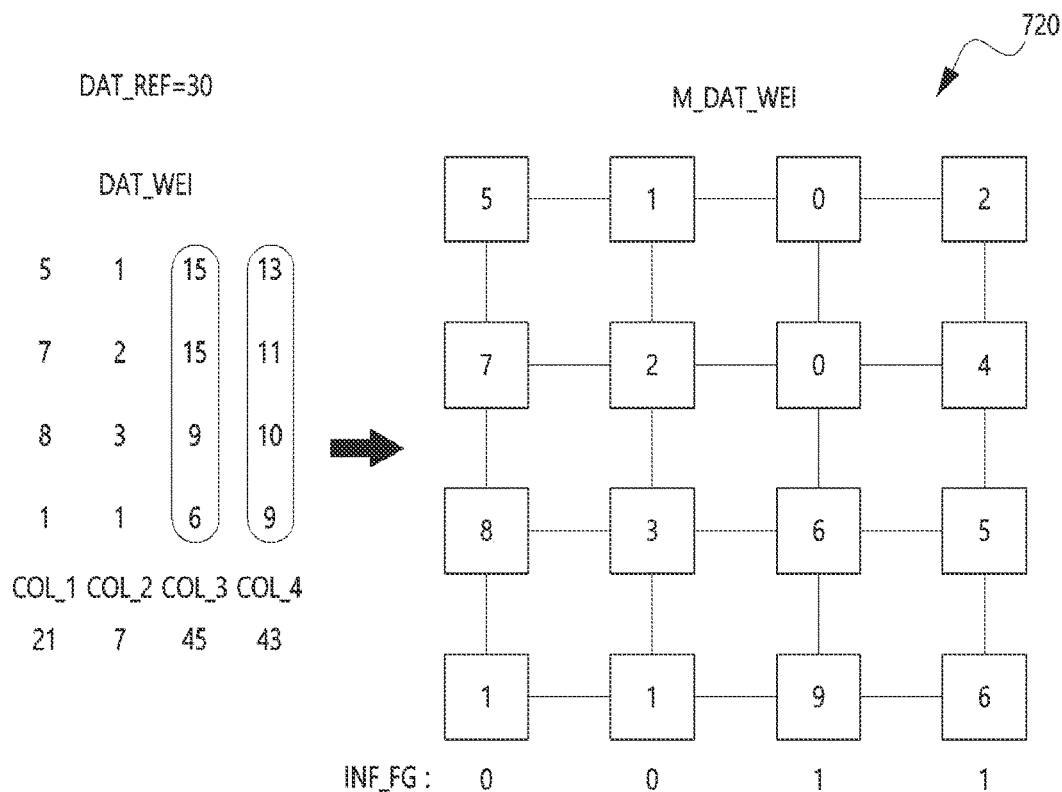
FIG. 8 is a conceptual view illustrating an operation of a data adjusting circuit of FIG. 7.

FIG. 8 is a conceptual view illustrating an operation of the data adjusting circuit 710 of FIG. 7. For convenience of description, it is assumed that the reference data value DAT_REF is '30'. The reference data value DAT_REF may correspond to a data value which is to be compared to the sum of the weight data values DAT_WEI on a memory column basis. The reference data value DAT_REF may be changed depending on settings.

Referring to FIGS. 7 to 8, the weight data values DAT_WEI may be inputted in the same manner as FIG. 3. When the sum of the weight data values DAT_WEI on a memory column basis is larger than the reference data value DAT_REF of '30', the corresponding memory column is marked with a circle.

The data adjusting circuit 710 of FIG. 7 may compare the weight data value DAT_WEI to the reference data value DAT_REF, and adjust the weight data value DAT_WEI. In this embodiment, the adjusting operation may be performed on a memory column basis. In other words, the sums of the weight data values DAT_WEI, corresponding to the first to fourth memory columns COL_1 to COL_4, respectively, may become '21', '7', '45', and '43'. The sums of the weight data values DAT_WEI, corresponding to the third and fourth memory columns COL_3 and COL_4, may be larger than the reference data value DAT_REF of '30'. Therefore, the data adjusting circuit 710 may adjust the weight data values DAT_WEI corresponding to each of the third and fourth memory columns COL_3 and COL_4. In other words, the data adjusting circuit 710 may invert the weight data values DAT_WEI corresponding to each of the third and fourth memory columns COL_3 and COL_4, and store the inverted weight data values in the memory cell array circuit 720.

For example, the weight data values DAT_WEI corresponding to the third memory column COL_3, i.e. '15', '15', '9', and '6', may be inverted on the basis of '7.5', for example, and adjusted to '0', '0', '6', and '9'. Furthermore, the weight data values DAT_WEI corresponding to the fourth memory column COL_4, i.e. '13', '11', '10', and '9', may be inverted and adjusted to '2', '4', '5', and '6'. The data adjusting circuit 710 may provide the adjusted weight data values M_DAT_WEI to the memory cell array circuit 720. In other words, the memory cell array circuit 720 may store the weight data values DAT_WEI corresponding to the first and second memory columns COL_1 to COL_2 as they are, and invert the weight data values DAT_WEI corresponding to the third and fourth memory columns COL_3 and COL_4 and store the inverted weight data values.

As will be described below, the flag information INF_FG may have data values of '0', '0', '1', and '1' corresponding to the first to fourth memory columns COL_1 to COL_4, respectively. When the flag information INF_FG is '0', it may indicate that the inverting operation, i.e. the adjusting operation, has not been performed on the corresponding memory column. Furthermore, when the flag information INF_FG is '1', it may indicate that the inverting operation, i.e. the adjusting operation, has been performed on the corresponding memory column.

As a result, the adjusted weight data value M_DAT_WEI corresponding to a low data level value may be stored in the memory cell circuit in which the weight data value DAT_WEI corresponding to a high data level value is to be stored. Therefore, since low data level values may be stored in the memory cell circuits included in the memory cell array circuit 720, the rates of change in the data level values stored therein may be minimized.

Figure 9:
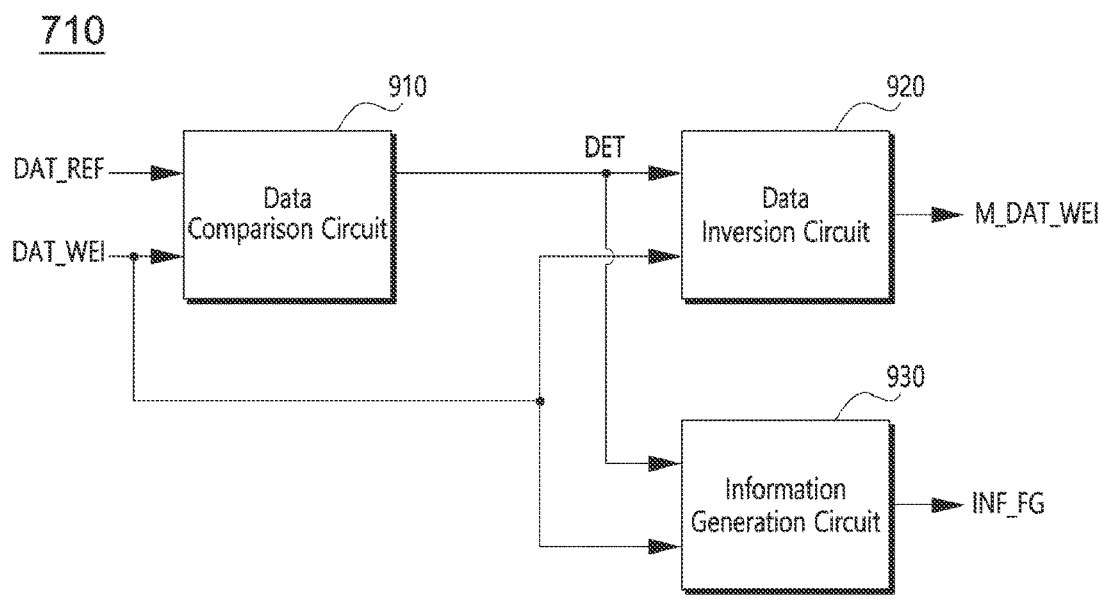
FIG. 9 is a block diagram illustrating a configuration of the data adjusting circuit of FIG. 7.

FIG. 9 is a block diagram illustrating a configuration of the data adjusting circuit 710 of FIG. 7.

Referring to FIG. 9, the data adjusting circuit 710 may include a data comparison circuit 910, a data inversion circuit 920, and an information generation circuit 930.

The data comparison circuit 910 may be configured to compare the weight data values DAT_WEI to the reference data value DAT_REF, and output the comparison result as a detection signal DET. As described with reference to FIG. 8, the data comparison circuit 910 may compare the weight data values DAT_WEI to the reference data value DAT_REF on a memory column basis. In other words, the comparison operation of the data comparison circuit 910 may be performed on a memory column basis.

The data inversion circuit 920 may be configured to generate the adjusted weight data values M_DAT_WEI by inverting the weight data values DAT_WEI on the basis of the detection signal DET. As described above with reference to FIG. 8, the data inversion circuit 920 may generate the adjusted weight data values M_DAT_WEI by inverting the weight data values on a memory column basis. In other words, the inverting operation of the data inversion circuit 920 may be performed on a memory column basis.

The information generation circuit 930 may be configured to generate the flag information INF_FG on the basis of the weight data value DAT_WEI and the detection signal DET. As described above, the flag information INF_FG may include position information corresponding to the memory column of the memory cell circuit, on which the adjusting operation has been performed. In this connection, the information generation circuit 930 may acquire position information of the memory column on which the adjusting operation has been performed on the basis of the weight data value DAT_WEI and the detection signal DET.

Figure 10:
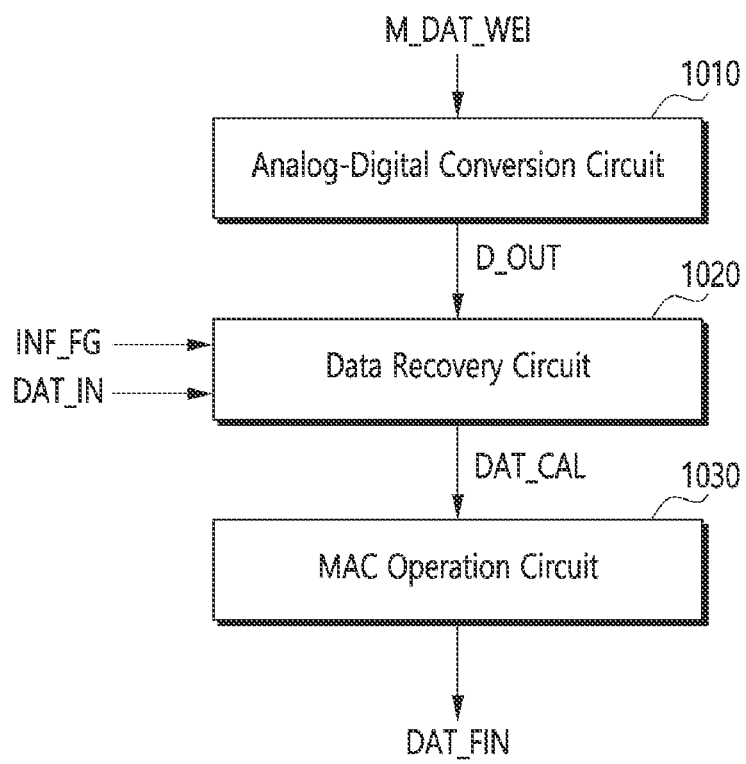
FIG. 10 is a block diagram illustrating a configuration of a data calculation circuit of FIG. 7.

FIG. 10 is a block diagram illustrating a configuration of the data calculation circuit 730 of FIG. 7.

Referring to FIGS. 7 and 10, the data calculation circuit 730 may include an analog-digital conversion circuit 1010, a data recovery circuit 1020 and a MAC operation circuit 1030.

The analog-digital conversion circuit 1010 may be configured to convert the adjusted weight data values M_DAT_WEI, outputted from the memory cell array circuit 720 of FIG. 7, into digital data values. The analog-digital conversion circuit 1010 may convert the adjusted weight data values M_DAT_WEI on a memory column basis. In other words, the analog-digital conversion circuit 1010 may perform an analog-digital conversion operation on a memory column basis.

The data recovery circuit 1020 may be configured to recover digital data values D_OUT outputted from the analog-digital conversion circuit 1010, on the basis of the input data values DAT_IN and the flag information INF_FG. As described above, the flag information INF_FG may include the position information of the memory column on which the adjusting operation has been performed. Therefore, the data recovery circuit 1020 may recover the adjusted weight data values M_DAT_WEI on a memory column basis, on the basis of the flag information INF_FG. In other words, the data recovery circuit 1020 may perform the recovery operation on a memory column basis.

The MAC operation circuit 1030 may be configured to perform a MAC operation on recovered calculation data values DAT_CAL outputted from the data recovery circuit 1020. The MAC operation circuit 1030 may generate a final data value DAT_FIN through the MAC operation, and output the generated final data value DAT_FIN. The MAC operation circuit 1030 of FIG. 10 may correspond to the MAC operation circuit 530 of FIG. 5.

Figure 11:
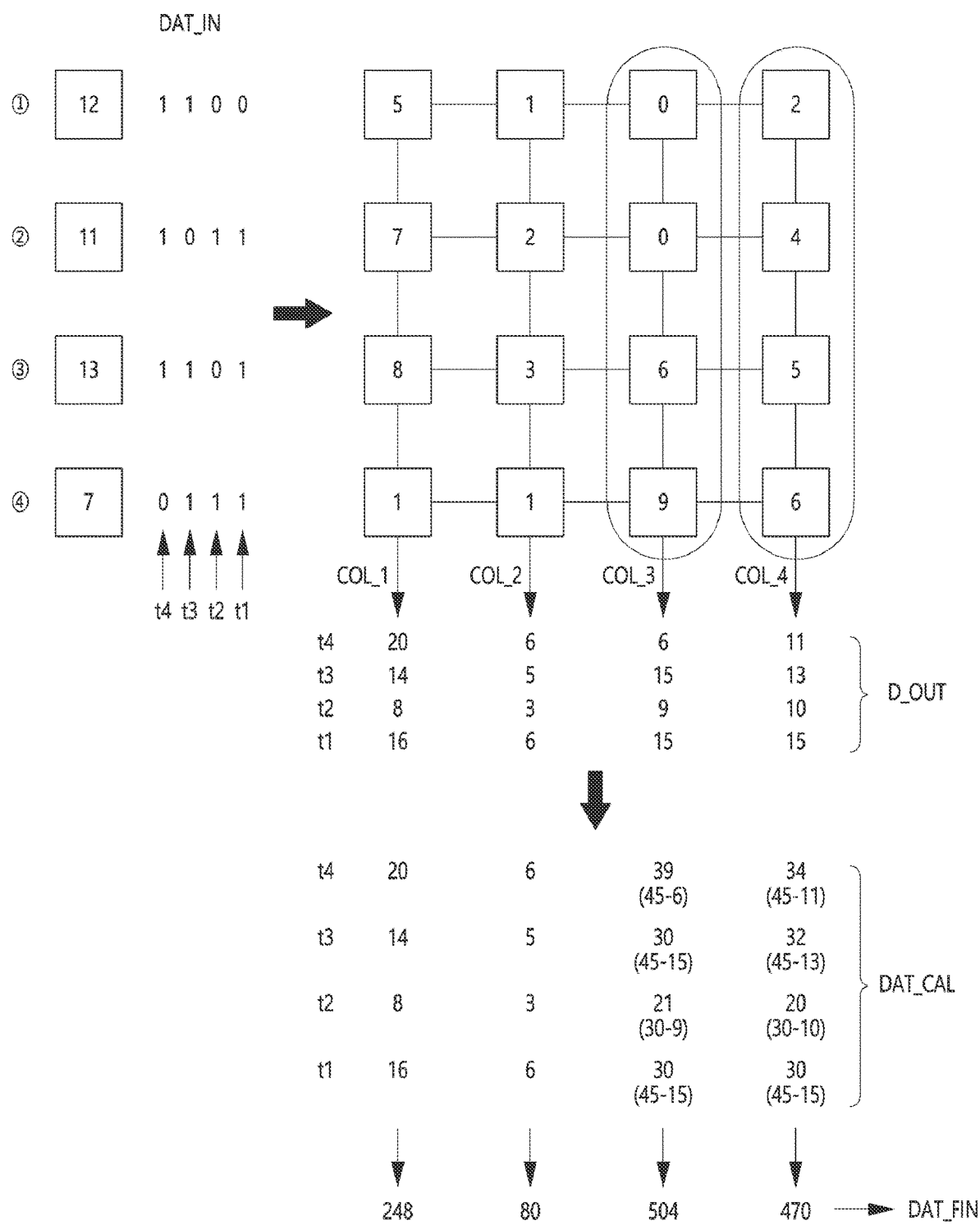
FIG. 11 is a conceptual view illustrating an operation of a data recovery circuit of FIG. 10.

FIG. 11 is a conceptual view illustrating an operation of the data recovery circuit 1020 of FIG. 10. For convenience of description, the adjusted weight data values M_DAT_WEI are set to the same values as the data values stored in the memory cell array circuit 720 of FIG. 8. Furthermore, each of the memory columns on which the adjusting operation has been performed is marked with a circle.

Referring to FIGS. 10 and 11, the analog-digital conversion circuit 1010 may receive the adjusted weight data values M_DAT_WEI, and convert the received weight data values into digital data values on a memory column basis. Therefore, the analog-digital conversion circuit 1010 may output '16', '8', '14', and '20' as the digital data values D_OUT of the first memory column COL_1, corresponding to the first to fourth input times t1 to t4 for the input data values DAT_IN. Furthermore, the analog-digital conversion circuit 1010 may output '6', '3', '5', and '6' as the digital data values D_OUT corresponding to the second memory column COL_2. Furthermore, the analog-digital conversion circuit 1010 may output '15', '9', '15', and '6' as the digital data values D_OUT corresponding to the third memory column COL_3 on which the adjusting operation has been performed. Furthermore, the analog-digital conversion circuit 1010 may output '15', '10', '13', and '11' as the digital data values D_OUT corresponding to the fourth memory column COL_4 on which the adjusting operation has been performed.

The data recovery circuit 1020 may be configured to perform a recovery operation on the digital data values D_OUT outputted from the analog-digital conversion circuit 1010, based on the flag information INF_FG and the input data values DAT_IN. As illustrated in FIG. 11, the data recovery circuit 1020 may output the digital data values D_OUT, corresponding to the first and second memory columns COL_1 and COL_2 on which the adjusting operation is not performed, as the recovered calculation data values DAT_CAL as they are. Furthermore, the data recovery circuit 1020 may correct the digital data values D_OUT corresponding to the third and fourth memory columns COL_3 and COL_4 on which the adjusting operation has been performed, and output the corrected digital data values as the recovered calculation data values DAT_CAL. The correction operation on the digital data values D_OUT corresponding to the third and fourth memory columns COL_3 and COL_4 will be described below in more detail.

Then, as will be described with reference to FIG. 11, the recovered calculation data values DAT_CAL of the third memory column COL_3 at the first input time t1 may become '30'. The recovered calculation data value DAT_CAL of '30' may correspond to a value calculated through an operation of subtracting the digital data value D_OUT of the analog-digital conversion circuit 1010 at the third memory column COL_3, corresponding to the first input time t1, from a value obtained by multiplying the number of 1's in the input data value DAT_IN inputted at the first input time t1 by the maximum data level value '15' which can be stored in the memory cell circuit, and which was used to invert the weights. In other words, the number of 1's in the input data value DAT_IN inputted at the first input time t1 may be counted as 3, and the digital data value D_OUT of the third memory column COL_3 at the first input time t1 may become '15'. Therefore, the recovered calculation data value DAT_CAL of the third memory column COL_3 at the first input time t1 may become '30 (=(3*15)−15)'.

For reference, the data recovery circuit 520 of FIG. 5 may perform the recovery operation through the inverting operation. In FIG. 11, the data recovery circuit 1020 may perform the recovery operation through the subtraction operation which will be described below.

Through the above-described recovery operation, the recovered calculation data values DAT_CAL of the third memory column COL_3 at the first to fourth input times t1 to t4 may be '30', '21', '30', and '39', respectively. Furthermore, the recovered calculation data values DAT_CAL of the fourth memory column COL_4 at the first to fourth input times t1 to t4 may become '30', '20', '32', and '34', respectively. As illustrated in the drawings, the recovered calculation data values DAT_CAL of FIG. 11 may be equal to the recovered calculation data values DAT_CAL of FIG. 6. Then, the recovered calculation data values DAT_CAL may be provided to the MAC operation circuit 1030 of FIG. 10, and outputted as the final data value DAT_FIN.

The semiconductor memory apparatus 700 in accordance with the present embodiment may perform the comparison operation, the adjusting operation, the analog-digital conversion operation and the recovery operation on a memory column basis.

Figure 12:
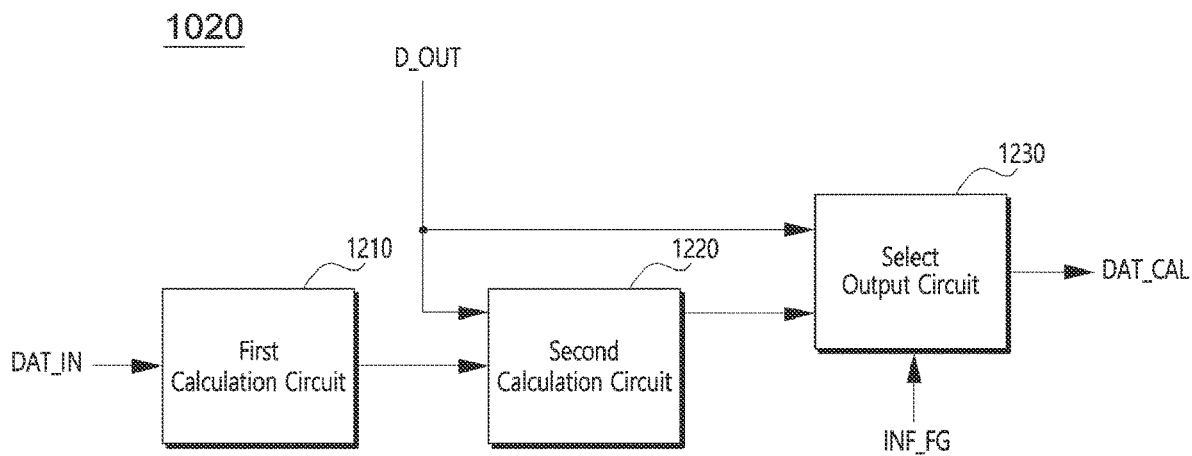
FIG. 12 is a block diagram illustrating a configuration of the data recovery circuit of FIG. 10.

FIG. 12 is a block diagram illustrating a configuration of the data recovery circuit 1020 of FIG. 10.

Referring to FIGS. 10 to 12, the data recovery circuit 1020 may include a first calculation circuit 1210, a second calculation circuit 1220 and a select output circuit 1230.

The first calculation circuit 1210 may be configured to count the number of enable data values in the input data value DAT_IN. The first calculation circuit 1210 may include a counting circuit for the counting operation. The first calculation circuit 1210 may be configured to perform a multiplication operation on the count value and a preset data level value. The enable data value may correspond to '1' in the input data value DAT_IN of FIG. 11. For reference, when the input data value DAT_IN is '1', the corresponding memory cell circuit may be enabled. The preset data level value may correspond to the maximum data level value '15', which can be stored in a memory cell circuit.

The first calculation circuit 1210 may count the enable data values of the input data value DAT_IN inputted at the first input time t1. In other words, the first calculation circuit 1210 may count the enable data values, i.e. '1's, in the input data value DAT_IN inputted at the first input time t1, and acquire '3' as the count value. The first calculation circuit 1210 may multiply the acquired count value '3' by the maximum data level value '15'. That is, the output data value outputted by the first calculation circuit 1210 at the first input time t1 may become '45'.

The second calculation circuit 1220 may be configured to perform a subtraction operation on the output data value of the first calculation circuit 1210 and the digital data value D_OUT of the analog-digital conversion circuit 1010 (see FIG. 10). Hereafter, for convenience of description, the third memory column COL_3 on which the adjusting operation has been performed will be taken as an example for description.

As described with reference to FIG. 11, the digital data value D_OUT of the analog-digital conversion circuit 1010 at the third memory column COL_3, corresponding to the first input time t1, may become '15'. Therefore, the second calculation circuit 1220 may subtract the digital data value D_OUT of '15', outputted from the analog-digital conversion circuit 1010, from the output data value of '45', outputted from the first calculation circuit 1210. Therefore, the second calculation circuit 1220 may output '30' as the result value of the subtraction operation of '45' minus '15'.

In this way, the output data values of the second calculation circuit 1220 at the third memory column COL_3, corresponding to the first to fourth input times t1 to t4, may become '30', '21', '30', and '39', respectively, as illustrated in FIG. 11. Furthermore, the output data values of the second calculation circuit 1220 at the fourth memory column COL_4, corresponding to the first to fourth input times t1 to t4, may become '30', '20', '32', and '34', respectively.

Referring back to FIG. 12, the select output circuit 1230 may be configured to select and output the digital data value D_OUT of the analog-digital conversion circuit 1010 and the output data value of the second calculation circuit 1220 as the recovered calculation data value DAT_CAL, on the basis of the flag information INF_FG. As illustrated in FIG. 8, the flag information INF_FG may have data values of '0', '0', '1', and '1' corresponding to the first to fourth memory columns COL_1 to COL_4, respectively. Therefore, the select output circuit 1230 may output the digital data value D_OUT of the analog-digital conversion circuit 1010 as the recovered calculation data value DAT_CAL in response to the first and second memory columns COL_1 and COL_2. Furthermore, the select output circuit 1230 may output the output data value of the second calculation circuit 1220 as the recovered calculation data value DAT_CAL in response to the third and fourth memory columns COL_3 and COL_4.

The semiconductor memory apparatus 700 in accordance with the present embodiment may be used to count the number of enable data values in the input data value DAT_IN on a memory column basis, and generate the recovered calculation data value DAT_CAL on the basis of the count value.

Figure 13:
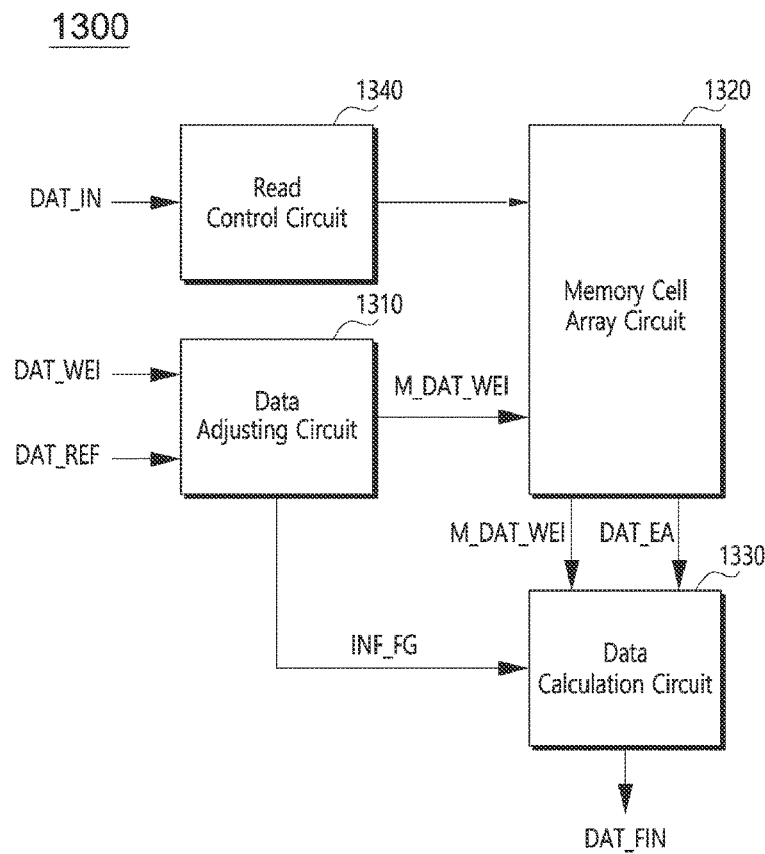
FIG. 13 is a block diagram illustrating a configuration of a semiconductor memory apparatus in accordance with an embodiment.

FIG. 13 is a block diagram illustrating a configuration of a semiconductor memory apparatus 1300 in accordance with an embodiment.

Referring to FIG. 13, the semiconductor memory apparatus 1300 may include a data adjusting circuit 1310, a memory cell array circuit 1320, a data calculation circuit 1330, and a read control circuit 1340. The semiconductor memory apparatus 1300 of FIG. 13 may be different from the semiconductor memory apparatus 700 of FIG. 7 in terms of the internal operations and internal configurations of the memory cell array circuit 1320 and the data calculation circuit 1330. For convenience of description, the following descriptions will be focused on the memory cell array circuit 1320 and the data calculation circuit 1330. For reference, the semiconductor memory apparatus 1300 of FIG. 13 may perform the comparison operation, the adjusting operation, the analog-digital conversion operation and the recovery operation on a memory column basis, like the semiconductor memory apparatus 700 of FIG. 7.

The memory cell array circuit 1320 may be configured to store the adjusted weight data value M_DAT_WEI and a coefficient data value DAT_EA. The memory cell array circuit 1320 will be described below in more detail with reference to FIG. 14.

The data calculation circuit 1330 may be configured to recover the adjusted weight data value M_DAT_WEI on the basis of the flag information INF_FG and the coefficient data value DAT_EA. The data calculation circuit 1330 will be described in more detail with reference to FIG. 15.

The semiconductor memory apparatus 700 of FIG. 7 may count the number of enable data values in the input data value DAT_IN, and perform a recovery operation using the count value. The semiconductor memory apparatus 1300 of FIG. 13 in accordance with the present embodiment may perform the recovery operation by using the coefficient data value DAT_EA stored in the memory cell array circuit 1320.

Figure 14:
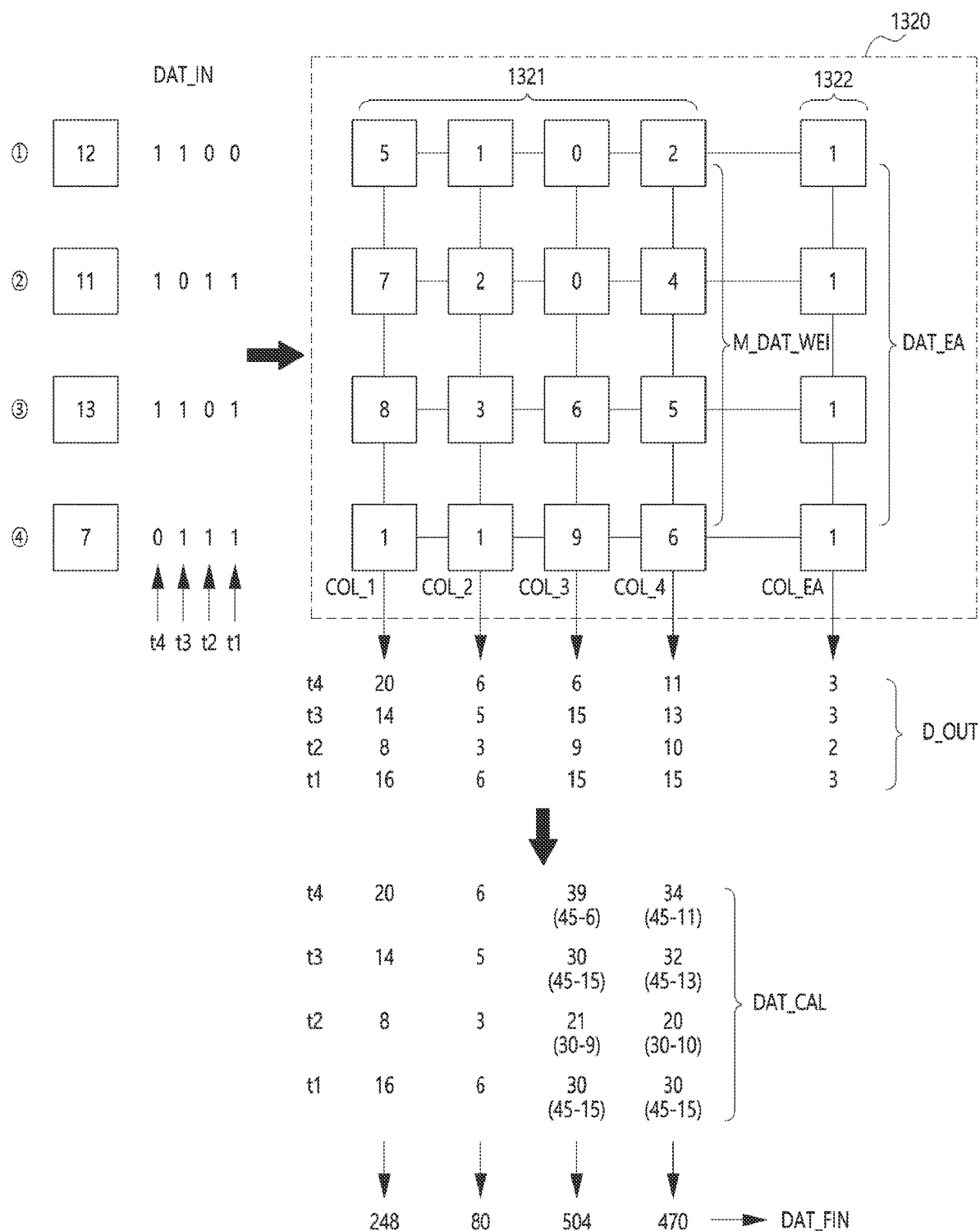
FIG. 14 illustrates a configuration of a memory cell array circuit and an operation of a data calculation circuit such as shown in FIG. 13.

FIG. 14 is a diagram illustrating a configuration of the memory cell array circuit 1320 and an operation of the data calculation circuit 1330 in FIG. 13.

Referring to FIG. 14, the memory cell array circuit 1320 may include a first memory group 1321 and a second memory group 1322.

The first memory group 1321 may be configured to store the adjusted weight data value M_DAT_WEI. The first memory group 1321 may correspond to the first to fourth memory columns COL1 to COL4 of FIG. 8. The adjusted weight data value M_DAT_WEI may be stored in the same manner as FIG. 11. The second memory group 1322 may be configured to store the coefficient data value DAT_EA. The second memory group 1322 may correspond to a coefficient memory column COL_EA.

Figure 15:
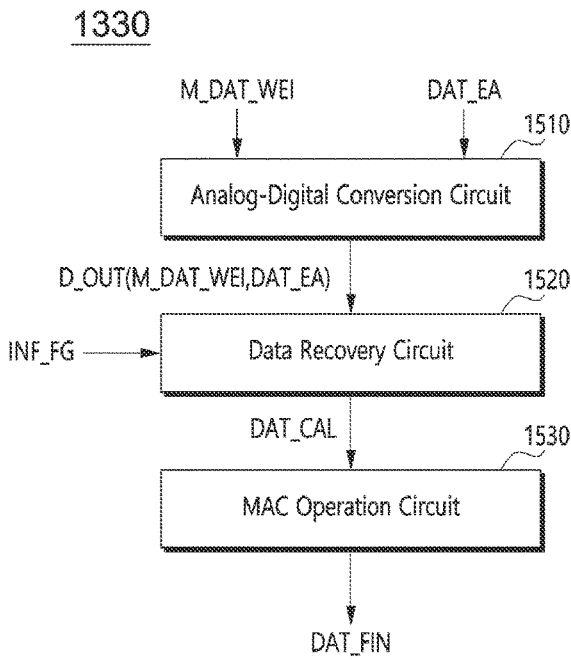
FIG. 15 is a block diagram illustrating a configuration of a data calculation circuit of FIG. 13.

Hereafter, for convenience of description, the configuration of the data calculation circuit 1330 of FIG. 13 will be first described. FIG. 15 is a block diagram illustrating a configuration of the data calculation circuit 1330 of FIG. 13.

Referring to FIGS. 13 and 15, the data calculation circuit 1330 may include an analog-digital conversion circuit 1510, a data recovery circuit 1520, and a MAC operation circuit 1530.

The analog-digital conversion circuit 1510 may be configured to convert the adjusted weight data value M_DAT_WEI and the coefficient data value DAT_EA, outputted from the memory cell array circuit 1320 of FIG. 13, into digital data values. The analog-digital conversion circuit 1510 may generate and output the digital data value D_OUT for the adjusted weight data value M_DAT_WEI and the digital data value D_OUT for the coefficient data value DAT_EA.

Referring back to FIG. 14, the analog-digital conversion circuit 1510 may output '16', '8', '14', and '20' as the digital data values D_OUT of the first memory column COL_1 at the first to fourth input times t1 to t4. Furthermore, the analog-digital conversion circuit 1510 may output '6', '3', '5', and '6' as the digital data values D_OUT of the second memory column COL_2. Furthermore, the analog-digital conversion circuit 1010 may output '15', '9', '15', and '6' as the digital data values D_OUT of the third memory column COL_3 on which the adjusting operation has been performed, and output '15', '10', '13', and '11' as the digital data values D_OUT of the fourth memory column COL_4. Furthermore, the analog-digital conversion circuit 1010 may output '3', '2', '3', and '3' as the digital data values D_OUT of the coefficient memory column COL_EA corresponding to the coefficient data value DAT_EA.

As shown in the illustrated example of FIG. 14, each of the cells in the second memory group 1322 has a same value corresponding to '1', and as a result the digital data value D_OUT corresponding to the coefficient data value DAT_EA may correspond to the number of 1's which are enable data included in the input data value DAT_IN. In other words, since three 1's are included as the enable data in the input data value DAT_IN at the first input time t1, the digital data value D_OUT may become '3'. Furthermore, since two 1's are included as the enable data in the input data value DAT_IN at the second input time t2, the digital data value D_OUT may become '2'. Furthermore, since three 1's are included as the enable data in the input data value DAT_IN at the third input time t3, the digital data value D_OUT may become '3'. Furthermore, since three 1's are included as the enable data in the input data value DAT_IN at the fourth input time t4, the digital data value D_OUT may become '3'.

Referring back to FIG. 15, the data recovery circuit 1520 may be configured to recover the digital data value D_OUT corresponding to the adjusted weight data value M_DAT_WEI outputted from the analog-digital conversion circuit 1510 on the basis of the flag information INF_FG and the digital data value D_OUT corresponding to the coefficient data value DAT_EA outputted from the analog-digital conversion circuit 1510. As will be described below, the data recovery circuit 1520 may perform a recovery operation on the adjusted weight data value M_DAT_WEI by using the coefficient data value DAT_EA. The data recovery circuit 1520 will be described in more detail with reference to FIG. 16.

The MAC operation circuit 1530 may be configured to perform a MAC operation on the recovered calculation data values DAT_CAL outputted from the data recovery circuit 1520. The MAC operation circuit 1530 may generate a final data value DAT_FIN through the MAC operation, and output the generated final data value DAT_FIN. The MAC operation circuit 1530 of FIG. 15 may correspond to the MAC operation circuit 1030 of FIG. 10.

Figure 16:
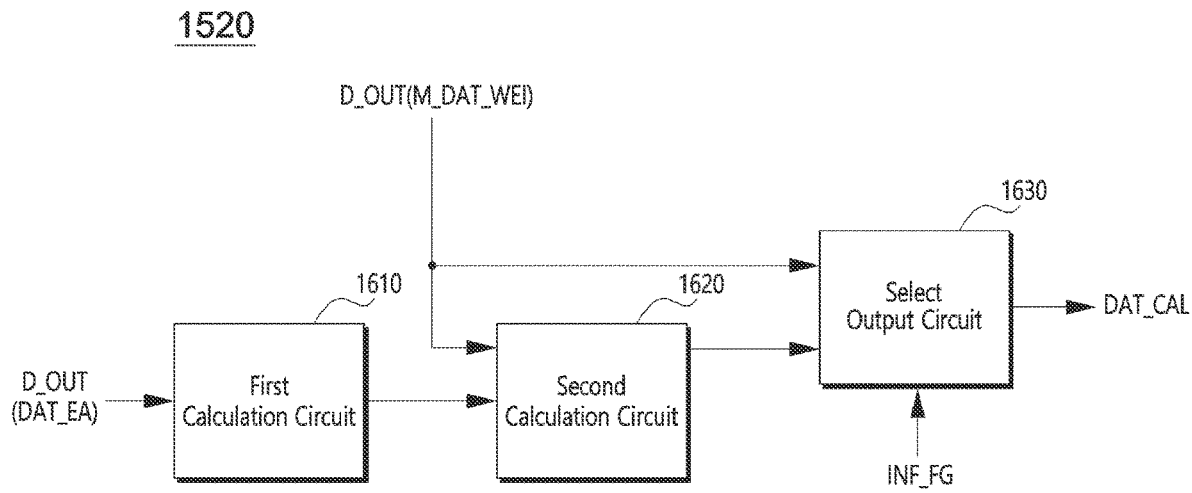
FIG. 16 is a block diagram illustrating a configuration of a data recovery circuit of FIG. 15.

FIG. 16 is a block diagram illustrating a configuration of the data recovery circuit 1520 of FIG. 15.

Referring to FIGS. 15 and 16, the data recovery circuit 1520 may include a first calculation circuit 1610, a second calculation circuit 1620, and a select output circuit 1630.

The first calculation circuit 1610 may be configured to perform a multiplication operation on the digital data value D_OUT corresponding to the coefficient data value DAT_EA and a preset data level value. As described with reference to FIG. 12, the preset data level value may correspond to the maximum data level value '15', which can be stored in a memory cell circuit.

Referring back to FIG. 14, the first calculation circuit 1610 may multiply the digital data value D_OUT of '3', corresponding to the coefficient data value DAT_EA at the first input time t1, by the maximum data level value '15'. That is, the output data value outputted by the first calculation circuit 1610 at the first input time t1 may become '45'. The first calculation circuit 1610 may multiply the digital data value D_OUT of '2', corresponding to the coefficient data value DAT_EA at the second input time t2, by the maximum data level value '15'. That is, the output data value outputted from the first calculation circuit 1610 at the second input time t2 may become '30'. Similarly, the output data value corresponding to each of the third and fourth input times t3 and t4 may become '45'.

Referring back to FIG. 16, the second calculation circuit 1620 may be configured to perform a subtraction operation on the output data value of the first calculation circuit 1610 and the digital data value D_OUT corresponding to the adjusted weight data value M_DAT_WEI. Hereafter, for convenience of description, the third memory column COL_3 on which the adjusting operation has been performed will be taken as an example for description.

As described above, the digital data value D_OUT of the analog-digital conversion circuit 1510 at the third memory column COL_3, corresponding to the first input time t1, may become '15'. Therefore, the second calculation circuit 1620 may subtract the digital data value D_OUT of '15', outputted from the analog-digital conversion circuit 1510, from the output data value '45', outputted from the first calculation circuit 1610. In other words, the second calculation circuit 1620 may output '30' as the result value of the subtraction operation between '45' and '15'.

In this way, the data values outputted from the second calculation circuit 1620 at the third memory column COL_3 in response to the first to fourth input times t1 to t4 may become '30', '21', '30', and '39', respectively, as shown in FIG. 14. Furthermore, the data values outputted from the second calculation circuit 1620 at the fourth memory column COL_4 in response to the first to fourth input times t1 to t4 may become '30', '20', '32', and '34', respectively.

Referring back to FIG. 16, the select output circuit 1630 may be configured to select and output the digital data value D_OUT of the analog-digital conversion circuit 1510 and the output data value of the second calculation circuit 1620 as the recovered calculation data value DAT_CAL, on the basis of the flag information INF_FG. In other words, the select output circuit 1630 may output the digital data values D_OUT of the analog-digital conversion circuit 1510, corresponding to the first and second memory columns COL_1 and COL_2, as the recovered calculation data values DAT_CAL, on the basis of the flag information INF_FG. Furthermore, the select output circuit 1630 may output the output data values of the second calculation circuit 1620, corresponding to the third and fourth memory columns COL_3 and COL_4, as the recovered calculation data values DAT_CAL, on the basis of the flag information INF_FG. The recovered calculation data value DAT_CAL of FIG. 14 may correspond to the recovered calculation data value DAT_CAL of FIG. 11 as a calculation result value for a stable MAC operation. Therefore, the semiconductor memory apparatus 1300 of FIG. 13 may reliably perform the MAC operation as illustrated in FIG. 14.

The semiconductor memory apparatus 1300 in accordance with the present embodiment may be used to generate the recovered calculation data value DAT_CAL based on the coefficient data value DAT_EA. For reference, the first calculation circuit 1210 of FIG. 12 may include a counting circuit configured to count the number of enable data values in the input data value DAT_IN. The first calculation circuit 1610 of FIG. 16 may include no counting circuit, but may acquire the same output data value as the first calculation circuit 1210 of FIG. 12.

Figure 17:
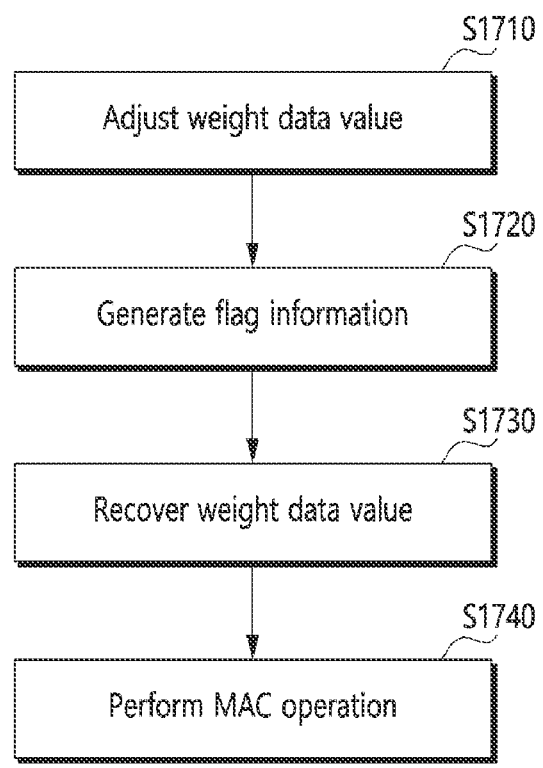
FIG. 17 is a flowchart illustrating an operation process of a semiconductor memory apparatus in accordance with an embodiment.

FIG. 17 is a flowchart illustrating an operation process S1700 of a semiconductor memory apparatus in accordance with an embodiment.

Referring to FIG. 17, the operation process S1700 of the semiconductor memory apparatus may include step S1700 of adjusting a weight data value DAT_WEI, step S1720 of generating flag information INF_FG, step S1730 of recovering into the weight data value DAT_WEI, and step S1740 of performing a MAC operation.

Step 1710 of adjusting the weight data value DAT_WEI may include adjusting the weight data value DAT_WEI by comparing the weight data value DAT_WEI for the MAC operation to the reference data value DAT_REF. Step S1710 of adjusting the weight data value DAT_WEI may be performed by the data adjusting circuit 110 of FIG. 1. As described above, step S1710 of adjusting the weight data value DAT_WEI may include inverting the weight data value DAT_WEI according to the comparison result between the weight data value DAT_WEI and the reference data value DAT_REF.

Step S1720 of generating the flag information INF_FG may include generating the flag information INF_FG indicating whether the weight data value DAT_WEI has been adjusted. Step S1720 of generating the flag information INF_FG may be performed by the data adjusting circuit 110 of FIG. 1. As described above, the flag information INF_FG may include position information corresponding to the memory cell circuit on which the adjusting operation has been performed.

Step S1730 of recovering into the weight data value DAT_WEI may include recovering the adjusted weight data value M_DAT_WEI into the weight data value DAT_WEI, on the basis of the flag information INF_FG. Step S1730 of recovering into the weight data value DAT_WEI may be performed by the data calculation circuit 130 of FIG. 1. As described above, step S1703 of recovering into the weight data value DAT_WEI may include performing the recovery operation by counting the number of enable data values in the input data value DAT_IN. Furthermore, step S1730 of recovering into the weight data value DAT_WEI may include performing the recovery operation by using the coefficient data value DAT_EA stored in the memory cell circuit.

Step S1740 of performing the MAC operation may include performing the MAC operation on the input data value DAT_IN and the weight data value DAT_WEI. Step S1740 of performing the MAC operation may be performed by the data calculation circuit 130 of FIG. 1.

Although not illustrated in FIG. 17, the operation process S1700 of the semiconductor memory apparatus may further include converting the adjusted weight data value M_DAT_WEI into a digital data value D_OUT, after step S1710 of adjusting the weight data value DAT_WEI. As described above, the comparison operation, the data adjusting operation, the analog-digital conversion operation and the recovery operation may be performed on a memory cell basis or memory column basis.

The operation process S1700 of the semiconductor memory apparatus in accordance with the present embodiment may adjust the weight data value DAT_WEI, thereby minimizing the rate of change in the data level value stored in the memory cell circuit.

While various embodiments have been described above, it will be understood to those skilled in the art that the embodiments described are examples only. Accordingly, the semiconductor memory apparatus and the operating method thereof, which are described herein, should not be limited based on the described embodiments.

What is claimed is:

1. A semiconductor memory apparatus comprising:
a data adjusting circuit configured to generate a detection signal by comparing a weight data value to a reference data value, to invert the weight data value on the basis of the detection signal, and to generate, on the basis of the weight data value and the detection signal, flag information indicating whether the weight data value has been inverted;
a memory cell array circuit configured to store the inverted weight data value outputted from the data adjusting circuit; and
a data calculation circuit configured to recover the inverted weight data value based on the flag information, and perform a MAC (Multiplication and ACcumulation) operation on an input data value and the recovered weight data value.

2. The semiconductor memory apparatus according to claim 1, wherein the memory cell array circuit comprises a plurality of memory cell circuits configured to store the inverted weight data value,
wherein the flag information comprises position information corresponding to a memory cell circuit which stores the inverted weight data value among the plurality of memory cell circuits.

3. The semiconductor memory apparatus according to claim 1, wherein the data adjusting circuit comprises:
a data comparison circuit configured to compare the weight data value and the reference data value by performing a comparison operation, and output a comparison result between the weight data value and the reference data value as a detection signal;

a data inversion circuit configured to invert the weight data value by performing an inverting operation on the basis of the detection signal; and an information generation circuit configured to generate the flag information on the basis of the weight data value and the detection signal.

4. The semiconductor memory apparatus according to claim 3, wherein the comparison operation of the data comparison circuit and the inverting operation of the data inversion circuit are performed on a memory cell basis in the memory cell array circuit.

5. The semiconductor memory apparatus according to claim 3, wherein the comparison operation of the data comparison circuit and the inverting operation of the data inversion circuit are performed on a memory column basis in the memory cell array circuit.

6. The semiconductor memory apparatus according to claim 1, wherein the data calculation circuit comprises:
   an analog-digital conversion circuit configured to convert the inverted weight data value outputted from the memory cell array circuit into a digital data value by performing an analog-digital conversion operation;
   a data recovery circuit configured to produce recovered calculation data values by performing, based on the flag information, a recovery operation on digital data values outputted from the analog-digital conversion circuit; and
   a MAC operation circuit configured to perform the MAC operation on the recovered calculation data values outputted from the data recovery circuit.

7. The semiconductor memory apparatus according to claim 6, wherein the analog-digital conversion operation of the analog-digital conversion circuit and the recovery operation of the data recovery circuit are performed on a memory cell basis in the memory cell array circuit.

8. The semiconductor memory apparatus according to claim 1, wherein the flag information comprises position information corresponding to each memory cell circuit that stores the inverted weight data value among the plurality of memory cell circuits.

9. The semiconductor memory apparatus according to claim 1, wherein the data calculation circuit comprises:
   an analog-digital conversion circuit configured to convert the inverted weight data value outputted from the memory cell array circuit into a digital data value by performing an analog-digital conversion operation;
   a data recovery circuit configured to produce recovered calculation data values by performing, based on the input data value and the flag information, a recovery operation on digital data values outputted from the analog-digital conversion circuit; and
   a MAC operation circuit configured to perform the MAC operation on the recovered calculation data values outputted from the data recovery circuit.

10. The semiconductor memory apparatus according to claim 9, wherein the analog-digital conversion operation of the analog-digital conversion circuit and the recovery operation of the data recovery circuit are performed on a memory column basis in the memory cell array circuit.

11. The semiconductor memory apparatus according to claim 1, wherein the flag information comprises position information corresponding to each memory column in which inverted weight data values produced by the data adjusting circuit are stored.

12. The semiconductor memory apparatus according to claim 9, wherein the data recovery circuit comprises:

a first calculation circuit configured to produce a count value by counting the number of enable data values in the input data value, and perform a multiplication operation on the count value and a preset data level value;
a second calculation circuit configured to perform a subtraction operation by subtracting the digital data value output by the analog-digital conversion circuit from a result of the multiplication operation performed by the first calculation circuit; and
a select output circuit configured to produce a recovered calculation data value by selecting, based on the flag information, one of the digital data value output by the analog-digital conversion circuit and a result of the subtraction operation performed by the second calculation circuit.

13. The semiconductor memory apparatus according to claim 1, wherein the memory cell array circuit is further configured to store a coefficient data value for determining the number of enable data values in the input data value.

14. The semiconductor memory apparatus according to claim 13, wherein the memory cell array circuit comprises:
   a first memory group configured to store the inverted weight data value; and
   a second memory group configured to store the coefficient data value.

15. The semiconductor memory apparatus according to claim 13, wherein the data calculation circuit comprises:
   an analog-digital conversion circuit configured to convert the inverted weight data value and the coefficient data value outputted from the memory cell array circuit, into a digital data value;
   a data recovery circuit configured to produce a recovered calculation data value by performing, based on the flag information, a recovery operation on the digital data value outputted from the analog-digital conversion circuit; and
   a MAC operation circuit configured to perform the MAC operation on the recovered calculation data value outputted from the data recovery circuit.

16. The semiconductor memory apparatus according to claim 15, wherein the data recovery circuit comprises:
   a first calculation circuit configured to perform a multiplication operation on the digital data value corresponding to the coefficient data value and a preset data level value;
   a second calculation circuit configured to perform a subtraction operation on an output data value of the first calculation circuit and the digital data value corresponding to the inverted weight data value; and
   a select output circuit configured to select and output the digital data value of the analog-digital conversion circuit and an output data value of the second calculation circuit as the recovered calculation data value, on the basis of the flag information.

17. An operation method of a semiconductor memory apparatus including a data adjusting circuit, a memory cell array circuit, and a data calculation circuit, the operation method comprising:
   generating, by the data adjusting circuit, a detection signal by comparing a weight data value to a reference data value;
   inverting, by the data adjusting circuit, the weight data value on the basis of the detection signal;

generating, by the data adjusting circuit on the basis of the weight data value and the detection signal, flag information indicating whether the weight data value has been inverted;

storing, by the memory cell array circuit, the inverted weight data value;

recovering, by the data calculation circuit, the inverted weight data value outputted from the memory cell array circuit into the weight data value, on the basis of the flag information; and performing, by the data calculation circuit, a MAC (Multiplication and ACcumulation) operation on an input data value and the recovered weight data value.

18. The operation method according to claim 17, wherein the flag information comprises position information corresponding to a memory cell circuit in which the inverted weight data value is stored.

19. The operation method according to claim 17, further comprising converting, by the data calculation circuit, the inverted weight data value into a digital data value.

20. The operation method according to claim 19, wherein the inverting the weight data value, the converting the inverted weight data value into the digital data value, and the recovering the inverted weight data value into the weight data value are performed on a memory cell basis.

21. The operation method according to claim 20, wherein the flag information comprises position information corresponding to a memory cell circuit in which the inverted weight data value is stored.

22. The operation method according to claim 19, wherein the inverting the weight data value, the converting the inverted weight data value into the digital data value, and the recovering the inverted weight data value into the weight data value are performed on a memory column basis.

23. The operation method according to claim 22, wherein the flag information comprises position information corresponding to a memory column in which the inverted weight data value is stored.

24. The operation method according to claim 17, wherein the recovering the inverted weight data value comprises producing a count value by counting the number of enable data values in the input data value, and performing a recovery operation based on the count value.

25. The operation method according to claim 17, further comprising storing, by
the memory cell array circuit, a coefficient data value for determining the number of enable data values in the input data value.

26. The operation method according to claim 25, wherein the recovering the inverted weight data value into the weight data value comprises performing a recovery operation on the basis of the coefficient data value.

* * * * *